United States Patent
Nagaraj et al.

(10) Patent No.: US 11,007,538 B2
(45) Date of Patent: *May 18, 2021

(54) FLOTATION REAGENTS AND FLOTATION PROCESSES UTILIZING SAME

(71) Applicant: Cytec Technology Corp., Wilmington, DE (US)

(72) Inventors: Devarayasamudram Ramachandran Nagaraj, Ridgefield, CT (US); Tarun Bhambhani, Stamford, CT (US); Mukund Vasudevan, Atlanta, GA (US); Puspendu Deo, Midland, MI (US); Haunn-Lin Tony Chen, Darien, CT (US)

(73) Assignee: Cytec Technology Corp., Wilmington, DE (US)

( * ) Notice: Subject to any disclaimer, the term of this patent is extended or adjusted under 35 U.S.C. 154(b) by 1342 days.

This patent is subject to a terminal disclaimer.

(21) Appl. No.: 15/165,351

(22) Filed: May 26, 2016

(65) Prior Publication Data

US 2016/0271624 A1    Sep. 22, 2016

Related U.S. Application Data

(60) Continuation of application No. 14/256,042, filed on Apr. 18, 2014, now Pat. No. 10,130,956, which is a division of application No. 12/503,904, filed on Jul. 16, 2009, now Pat. No. 8,720,694.

(60) Provisional application No. 61/083,734, filed on Jul. 25, 2008.

(51) Int. Cl.
| | |
|---|---|
| *B03D 1/016* | (2006.01) |
| *B03D 1/02* | (2006.01) |
| *B03D 1/06* | (2006.01) |
| *C01G 53/11* | (2006.01) |
| *C22B 3/00* | (2006.01) |
| *C22B 3/12* | (2006.01) |
| *C22B 3/14* | (2006.01) |
| *C22B 3/16* | (2006.01) |
| *C22B 3/24* | (2006.01) |
| *C22B 15/00* | (2006.01) |
| *C22B 34/34* | (2006.01) |
| *B03D 1/008* | (2006.01) |
| *B03D 1/01* | (2006.01) |
| *B03D 1/012* | (2006.01) |
| *B03D 1/014* | (2006.01) |

(52) U.S. Cl.
CPC .............. *B03D 1/02* (2013.01); *B03D 1/016* (2013.01); *C01G 53/11* (2013.01); *C22B 3/00* (2013.01); *C22B 3/12* (2013.01); *C22B 3/14* (2013.01); *C22B 3/16* (2013.01); *C22B 3/24* (2013.01); *C22B 11/04* (2013.01); *C22B 15/0078* (2013.01); *C22B 15/0086* (2013.01); *C22B 23/0446* (2013.01); *C22B 23/0453* (2013.01); *C22B 34/34* (2013.01); *B03D 1/008* (2013.01); *B03D 1/01* (2013.01); *B03D 1/012* (2013.01); *B03D 1/014* (2013.01); *B03D 2201/007* (2013.01); *B03D 2201/02* (2013.01); *B03D 2203/02* (2013.01); *B03D 2203/025* (2013.01)

(58) Field of Classification Search
CPC .......... B03D 1/02; B03D 1/016; B03D 1/008; B03D 1/01; B03D 1/012; B03D 1/014; B03D 2201/007; B03D 2201/02; B03D 2203/02; B03D 2203/025
USPC ................................................ 209/166, 167
See application file for complete search history.

(56) References Cited

U.S. PATENT DOCUMENTS

| | | | |
|---|---|---|---|
| 1,976,679 A | 10/1934 | Fikentscher et al. | |
| 2,471,384 A * | 5/1949 | Booth .................... | B03D 1/012 209/167 |
| 2,740,522 A | 4/1956 | Aimone et al. | |
| 3,452,867 A | 7/1969 | Bishop | |
| 3,572,504 A | 3/1971 | DeCuyper | |
| 3,805,951 A | 4/1974 | Brogoitti et al. | |
| 3,929,629 A | 12/1975 | Griffith et al. | |
| 4,126,276 A | 11/1978 | Manfroy et al. | |
| 4,126,277 A | 11/1978 | Manfroy et al. | |
| 4,126,278 A | 11/1978 | Manfroy et al. | |
| 4,136,830 A | 1/1979 | Manfroy et al. | |
| 4,162,044 A | 7/1979 | Manfroy et al. | |
| 4,162,045 A | 7/1979 | Katzer et al. | |
| 4,208,275 A | 6/1980 | Gomes et al. | |
| 4,289,613 A | 9/1981 | Goodman et al. | |
| 4,297,160 A | 10/1981 | Kusayama et al. | |
| 4,360,425 A | 11/1982 | Lim et al. | |

(Continued)

FOREIGN PATENT DOCUMENTS

| | | | |
|---|---|---|---|
| AU | 502457 B | * | 7/1979 |
| AU | 729901 B2 | | 11/1997 |

(Continued)

OTHER PUBLICATIONS

Anita Ansari et al., Floatability of chalcoprite and molybdenite in the presence of lignosulfonates; Minerals Engineering 20 (2007) pp. 609-616.

Zhang, Jian-Feng et al., Depressing effect of hydroxamic polyacrylamide on pyrite; J. Cent. South Univ. Technol., vol. 11 (4) (2004) pp. 380-384.

Zhivankov et al., Obogashchenie Rud, 1983 28 (4) pp. 15-18 (English translation, pp. 1-8).

G.D. Senior et al., "The selective flotation of pentlandite from a nickel ore;" International Journal of Mineral Processing (1995) vol. 43; issues 3-4; pp. 209-234.

(Continued)

*Primary Examiner* — Thomas M Lithgow

(74) *Attorney, Agent, or Firm* — Charles E. Bell, Esq.

(57) ABSTRACT

Methods of enhancing recovery of value sulfide and/or precious metal-bearing minerals from an ore containing such minerals as well as Mg-silicate, slime forming minerals, and/or clay by adding a froth phase modifier agent to the ore, and subjecting the ore to a froth flotation process performed under acidic conditions, are provided herein.

14 Claims, No Drawings

(56) References Cited

U.S. PATENT DOCUMENTS

| | | | |
|---|---|---|---|
| 4,480,067 A | 10/1984 | Vio et al. | |
| 4,532,046 A | 7/1985 | Meunier et al. | |
| 4,536,296 A | 8/1985 | Vio | |
| 4,552,652 A | 11/1985 | Attia et al. | |
| 4,584,097 A | 4/1986 | Fu et al. | |
| 4,587,306 A | 5/1986 | Vio et al. | |
| 4,595,493 A * | 6/1986 | Nagaraj | B03D 1/012 |
| | | | 209/166 |
| 4,719,009 A | 1/1988 | Furey et al. | |
| 4,720,339 A | 1/1988 | Nagaraj et al. | |
| 4,744,893 A | 5/1988 | Rothenberg et al. | |
| 4,808,301 A | 2/1989 | Hansen et al. | |
| 4,810,296 A | 3/1989 | Guerro et al. | |
| 4,866,150 A | 9/1989 | Lipp et al. | |
| 4,868,228 A | 9/1989 | Gonnet et al. | |
| 4,902,764 A | 2/1990 | Rothenberg et al. | |
| 4,902,765 A | 2/1990 | Wang et al. | |
| 4,919,821 A | 4/1990 | Fong et al. | |
| 4,929,425 A | 5/1990 | Hoots et al. | |
| 5,047,144 A | 9/1991 | Dobias et al. | |
| 5,126,038 A | 6/1992 | Nagaraj | |
| 5,131,600 A | 7/1992 | Klimpel et al. | |
| 5,217,604 A | 6/1993 | Barwise et al. | |
| 5,304,317 A | 4/1994 | Barwise et al. | |
| 5,308,498 A | 5/1994 | Fong et al. | |
| 5,507,395 A | 4/1996 | Wang et al. | |
| 5,525,212 A | 6/1996 | Nagari et al. | |
| 5,531,330 A | 7/1996 | Nagaraj et al. | |
| 5,533,626 A | 7/1996 | Nagaraj et al. | |
| 5,693,692 A | 12/1997 | Bulatovic et al. | |
| 5,756,622 A | 5/1998 | Wang et al. | |
| 6,536,595 B2 | 3/2003 | Kowalski et al. | |
| 6,945,407 B2 | 9/2005 | Senior | |
| 7,299,930 B2 | 11/2007 | Correa-Castillo et al. | |
| 7,360,656 B2 | 4/2008 | Santos | |
| 8,720,694 B2 * | 5/2014 | Nagaraj | C22B 15/0078 |
| | | | 209/166 |
| 10,130,956 B2 * | 11/2018 | Nagaraj | B03D 1/02 |
| 2004/0217070 A1 | 11/2004 | Senior et al. | |
| 2006/0151360 A1 | 7/2006 | Wright et al. | |
| 2008/0197053 A1 | 8/2008 | Wang et al. | |
| 2014/0314641 A1 | 10/2014 | Nagaraj et al. | |

FOREIGN PATENT DOCUMENTS

| | | |
|---|---|---|
| CA | 616687 A | 3/1961 |
| CA | 2175174 C | 1/2007 |
| CN | 101428248 A | 5/2009 |
| EP | 0338276 B1 | 10/1989 |
| GB | 1456392 | 9/1973 |
| WO | 199604332 A1 | 2/1996 |
| WO | 2006084170 A2 | 8/2006 |
| WO | 2009029753 A1 | 3/2009 |

OTHER PUBLICATIONS

Ryaboi et al., "Effective reagents for the flotation of tin ores;" lzd. Nauka Moscow (1981), pp. 128-133.

Hai-Pu Li et al., "Effect of hydroxamic acid polymers on reverse flotation of bauxite;" J. Cent. South Univ. Technol., vol. 11 (3) (2004); pp. 291-294.

Kristen E. Bremmell et al., "Pentlandite-lizardite interactions and implications for their separation by flotation;" Colloids & Surfaces Jrnl, (2005) vol. 252 # 2-3; pp. 207-212.

S. M. Bulatovic, "Evaluation of alternative reagent schemes for the flotation of platinum group minerals from various ores;" Minerals Engrg (2003) vol. 16; issue 10; pp. 931-939.

Bulatovic et al., "Selection and evaluation of different depressants systems for flotation of complex sulphide ores;" Minerals Engrg (1995); vol. 8; issues 1-2; pp. 63-76.

S. M. Bulatovic, "Use of organic polymers in the flotation of polymetallic ores: A review;" Minerals Engrg (1999) vol. 12; issue 4; pp. 341-354.

B. Klein et al., "Rheology modifies for mineral suspensions;" Minerals and Metallurgical Processing (2005) vol. 22; issue 2; pp. 83-88.

Klimpel et al., "TL-12 Chemistry of mineral slurry rheology control grinding aids;" Minerals & Metallurgical Processing (1989) pp. 35-43.

D. Lascelles, "Depressant Action of Ca and Mg on Flotation of Cu Activated Sphalerite;" Canadian Metallurgical Quarterly (2003) vol. 42; issue 2; pp. 133-140.

Bulatovic, "Flotation behaviour of gold during professing of porphyry copper-gold ores and refractory gold-bearing sulphides;" Minerals Engrg (1997) vol. 10; issue 9; pp. 895-908.

E. J. Wellham et al., "The role of carboxy methyl cellulose in the flotation of a nickel sulphide transition ore;" Minerals Engrg (1992) vol. 5; issues 3-5; pp. 381-395.

Written Opinion of PCT/US2009/050784; dated Sep. 1, 2010.

International Search Report of PCT/US2009/050784; dated Sep. 1, 2010.

* cited by examiner

FLOTATION REAGENTS AND FLOTATION PROCESSES UTILIZING SAME

CROSS-REFERENCE TO RELATED APPLICATIONS

This application is a continuation of U.S. patent application Ser. No. 14/256,042, filed on Apr. 18, 2014 (now U.S. Pat. No. 10,130,956 issued Nov. 20, 2018), which is a divisional of U.S. application Ser. No. 12/503,904 filed Jul. 16, 2009 (now U.S. Pat. No. 8,720,694 issued May 13, 2014), which claims benefit of priority to U.S. Provisional Application No. 61/083,734 filed Jul. 25, 2008, each of which is expressly incorporated herein by reference.

BACKGROUND

Field

The disclosed subject matter relates to flotation reagents and a froth flotation process for using the flotation reagents for the enhanced recovery of value sulfide minerals and precious metals from ores containing Mg-silicates, slime forming minerals and/or clays. More particularly, the disclosed subject matter relates to the use of certain modifiers, referred to as froth phase modifiers, either alone or with certain monovalent ion modifier enhancing agents and further in combination with certain collectors, and a flotation process using these reagents for the enhanced recovery of value sulfide minerals and precious metals from Mg-silicate containing ores, slime forming ores and/or clay containing ores.

Related Art

Froth flotation is a widely used process for beneficiating ores containing minerals and metals of interest, referred to as "value minerals". The term value minerals is meant to include not only minerals of value, but also metals of value, such as copper and precious metals such as gold, silver, and platinum group metals, and combinations thereof. Certain theory and practice state that success of a flotation process for base metal sulfide and precious metal ores depends on reagents known as "collectors," which impart selective hydrophobicity to the value mineral which is separated from other minerals. See U.S. Pat. No. 4,584,097 which is hereby incorporated herein by reference.

Other reagents, such as "frothers", may be added to the process to provide a suitable basic froth phase to capture hydrophobic value minerals and facilitate separation and recovery thereof. Certain other reagents, referred to as "modifiers" in a broad sense, may be used to enhance separation and recovery of value minerals and metals. Modifiers which can include pH regulators may be used to modify and control pH of the ore pulp in order to enhance separation and recovery of value mineral. In some instances, activators, such as copper sulfate, may be used to activate a certain value sulfide mineral in order to enhance collector coating on this sulfide mineral. Certain other modifiers also contribute to successful flotation separation of the value sulfides and precious metals. See U.S. Pat. No. 5,531,330, which is incorporated herein by reference. Modifiers include, but are not necessarily limited to, all reagents whose principal function is neither collecting nor frothing, but can typically be used to modify the surface of the mineral so that it does not float. Additionally, modifiers can be used to modify water chemistry, the surface of the froth bubbles and are generally used to optimize the conditions for floating a chosen value mineral or metal. In addition to attempts at making collectors more selective for value sulfide minerals and precious metals, modifiers can also be used to address the problem of improving the flotation separation of value sulfide minerals and precious metals as depressants or dispersants, to prevent or reduce non-sulfide gangue minerals reporting to the concentrate of mineral and metal values. A depressant is a modifier reagent which acts selectively on certain unwanted minerals and prevents or inhibits their flotation. A dispersant is a modifier reagent that functions substantially similar to the depressant, but it may also reduce the slurry viscosity and disperse fines or slimes and other functions.

Certain other modifier reagents as discussed herein are referred to as "froth phase modifiers." As used herein, the term "froth phase modifier" means any reagent that may improve the properties of the froth phase and thereby enhance separation and recovery of value minerals, as well as reagents that may have beneficial effects in the pulp or slurry phase such as viscosity reduction of the slurry, depression or dispersion of certain silicates, and the like. The term "froth phase modifier" also encompasses reagents that have more than one function or purpose in the froth flotation process, e.g., act as a modifier of the froth phase and a depressant or dispersant.

It is widely accepted that the presence of certain non-sulfide silicate gangue minerals such as Mg-bearing silicates, slime-forming minerals and/or clays in certain sulfide mineral and precious metal ores may be problematic due to their adverse effects on value mineral separation and recovery even if very selective value mineral collectors are used. Examples of such silicates include, but are not limited to: serpentines, amphiboles, actinolite, chrysotile, tremolite, biotite, lizardite, antigorite, chlorite, sericite, and clay minerals. These silicates are often present in Mg-containing ores, slime forming ores and clay containing ores. Certain other Mg-bearing silicates, known as "naturally hydrophobic Mg-silicates," such as talc and pyrophyllite, may also be present in these ores. The naturally hydrophobic Mg-silicates are also problematic in view of their significant natural floatability.

Reagents that selectively depress naturally hydrophobic Mg-silicates are known in the art, and examples include polysaccharides such as guar gum, carboxymethyl cellulose, and polymers such as those disclosed in U.S. Pat. Nos. 5,531,330 and 5,533,626 and references therein. The reagents known to selectively depress naturally hydrophobic Mg-silicates are often found to be less effective for depressing the above-mentioned Mg-bearing silicates, slime-forming minerals and/or clays in Mg-containing ores, slime forming ores and clay containing ores. As a result, when a complex mixture of silicates is present in an ore, these known reagents do not yield sufficient improvement in value mineral separation and recovery. In other words, merely depressing naturally hydrophobic Mg-silicates, such as talc and pyrophyllite, may not be sufficient to obtain desired metallurgical performance. Many other reagents have been disclosed in the art as depressants or dispersants to alleviate problems associated with the non-hydrophobic Mg silicates, slimes and/or clays in both sulfide and non-sulfide mineral flotation separation systems.

In addition to poor or inadequate recovery of value minerals, the value mineral concentrate grades are often lowered by the presence of Mg-bearing silicates, slime-forming minerals and/or clays in Mg-silicate containing ores, slime forming ores and clay containing ores, which a) add to the cost of handling and transportation of the concentrate, b) compete for space in the froth phase during the flotation stage, thereby reducing the overall value mineral recovery, c) adversely affect the froth phase properties, thereby decreasing efficiency of separation in the froth phase, and d) create a significant problem in subsequent smelting of concentrates by increasing slag viscosity requiring higher operating temperature or causing significant metal losses to the slag.

The severity of the effect of silicates is believed to be influenced by the type, morphology and the amount of the silicates present in the ore. The adverse effects have been attributed to several factors including, for example, the tendency of silicate minerals to form a complex network structure in the pulp or slurry phase leading to a significant increase in pulp or slurry viscosity, which somehow hinders the separation of value minerals from the gangue silicate minerals. Another proposed theory is the formation of a coating of these silicates on the value minerals, thus blinding them to the collector action which in turn affects the separation, a phenomenon commonly described in the art as "slime coating".

Although the inventors do not subscribe to or wish to be bound by any of the proposed theories, in some systems containing certain silicates, there appears to be no noticeable effect of these silicates on pulp phase properties, while there is a large adverse effect on froth phase properties, value mineral recovery and the grade of the concentrate. At times, it has also been observed that the value mineral recovery is not impacted at all, but the concentrate grade is adversely affected. In other systems, the presence of even a small amount of some of certain silicates, around 1-2%, may have an adverse effect on the value mineral recovery.

When the amount of the Mg-bearing silicates, slime-forming minerals and/or clays present in an ore is high (e.g. >0 to 80%), the pulp phase viscosity increases to such an extent that the processing of Mg-containing ores, slime forming ores and clay containing ores becomes challenging, thus rendering commonly used methods, processes and reagents inefficient. Well-known solutions to the problem are often inadequate and/or unattractive. For example, reduction of the percent of solids or slurry density to improve value mineral recovery and grade often suffers from several drawbacks, including, but not limited to: reduction of plant throughput and production, increase of consumption of water resources, reduction of comminution efficiency and insufficient improvement in value recovery or grade.

Another proposed solution has been the use of dispersants such as sodium silicate, soda ash, carboxymethyl cellulose, sodium poly phosphate, lignin sulfonate, and the like, which suffer from similar drawbacks as mentioned above. A further proposed solution has been making a size separation from the pulp or slurry prior to flotation. Thus, for example, the ground pulp or slurry is split into two size fractions: a sand (or coarse) fraction and a slime (or fines) fraction; or it is split into three size fractions: coarse, fine and slimes. US Patent Application Publication No. 20040217070 details one particular application of this concept that requires a large number of cyclones, significant capital and operational costs, and variability in size splits and plant performance. For some ores, even after desliming or size separation and treating the different size fractions separately, the overall performance improvement may be insufficient to justify implementing the solution.

SUMMARY

The disclosed subject matter relates to certain modifiers, more specifically froth phase modifiers, which improve froth structure, reduce froth viscosity and/or enhance recovery and/or grade of sulfide and precious metal value minerals and/or rejection of unwanted gangue silicate minerals. As discussed in more detail below, the froth phase modifiers can be used with monovalent ion modifier enhancing agents in sulfide value mineral recovery process alone or in combination with certain collectors and other desired reagents such as depressants, frothers, dispersants and the like. The disclosed subject matter also relates to a value mineral recovery process conducted under basic or alkaline, or under acidic conditions. These froth phase modifiers, collectors and process parameters offer a solution to overcome problems associated with silicates and their slimes and/or clays in sulfide and precious metal ores and offer significant benefits. Examples of such benefits include, but are not limited to, processing of such ores without any desliming or size separation, processing at high solids in the grinding and flotation stages, savings in energy and water resources because of reduction in pulp viscosity and operation at high solids, significant improvement in recovery and grade of value minerals, simplified flow sheets, tolerance to ore variability, and increase in throughput. Another significant benefit is that the froth phase modifiers of the present invention are very selective in that they do not depress the flotation of mineral values and precious metals unlike the commonly used reagents.

One aspect relates to a method of enhancing recovery of value minerals from a sulfide or precious ore containing Mg-silicate, slime forming minerals and/or clay, said method comprising the steps of: crushing an ore containing Mg-silicate, slime forming minerals and/or clay to form crushed ore; grinding said crushed ore to form ground ore; and subjecting said ground ore to a flotation process; wherein at least one froth phase modifier and, when the flotation is carried out under alkaline conditions, a monovalent ion modifier enhancing agent, are added to at least one of said crushed ore, said ground ore, and combinations thereof, wherein said froth phase modifier is a polymer comprising at least one functional group selected from the group consisting of carboxyl groups or groups when hydrolyzed become carboxyl groups, sulfonate groups or acids thereof, phosphate or phosphonate or phosphinate groups or acids thereof, hydroxamate groups or acids thereof, silane or silanol groups, and combinations thereof, and optionally one or more hydrophobic groups. The polymer froth phase modifiers can be, for example purposes only, homopolymers, copolymers or terpolymers. A collector is optionally added to at least one of said crushed ore, said ground ore, and combinations thereof, thereby enhancing recovery of the sulfide or precious metal value minerals from said ore containing Mg-silicate, slime forming minerals and/or clay. Those skilled in the art will appreciate that other reagents such as frothers, depressants, dispersants and the like may be added as necessary.

Another aspect relates to a method of enhancing recovery under acidic conditions of a value mineral from a sulfide or precious mineral containing ore containing Mg-silicate, slime forming minerals and/or clay, said method comprising the steps of: crushing an ore containing Mg-silicate, slime forming minerals and/or clay to form crushed ore; grinding said crushed ore to form ground ore; and subjecting said ground ore to a flotation process; wherein at least one froth phase modifier is added to at least one of said crushed ore, said ground ore, and combinations thereof, wherein said froth phase modifier is a polymer comprising at least one functional group selected from the group consisting of sulfonate groups or acids thereof, phosphate or phosphonate or phospinate groups or acids thereof, hydroxamate groups or acids thereof, silane or silanol groups, and combinations thereof, and optionally one or more hydrophobic group. A collector is optionally added to at least one of said crushed ore, said ground ore, and combinations thereof, thereby enhancing recovery of value minerals from said ore containing Mg-silicate, slime forming minerals and/or clay.

Another aspect relates to a composition comprising: ground ore particles of a sulfide or precious metal containing ore which also contain Mg-silicate, slime forming minerals and/or clay; a monovalent ion modifier enhancing agent and at least one froth phase modifier, wherein said froth phase modifier is a polymer comprising at least one functional group selected from the group consisting of carboxyl groups or groups when hydrolyzed become carboxyl groups, sulfonate groups or acids thereof, phosphate or phosphonate or phosphinate groups or acids thereof, hydroxamate groups or acids thereof, silane or silanol groups, and combinations thereof and optionally hydrophobic groups and a collector, wherein the collector comprises a compound selected from alkoxycarbonyl alkyl dithiocarbamate, mercaptobenzothiazole, dialkyl dithiocarbamate, diaryl or dialkyl dithiophosphate, dialkyl dithiophosphinate, alkoxycarbonyl alkyl thionocarbamate, allyl alkyl thionocarbamate, allyl alkyl xanthate ester, dialkyl thionocarbamate, and combinations thereof.

Yet a further aspect relates to a kit for improving recovery of value minerals from sulfide or precious metal containing ores that contain Mg-silicate, are slime forming or contain clay, said kit for use in alkaline conditions comprising: a container of monovalent ion modifier enhancing reagent, and a container of froth phase modifier, wherein said froth phase modifier is a polymer comprising a functional group selected from the group consisting of carboxyl groups or groups when hydrolyzed become carboxyl groups, sulfonate groups or acids thereof, phosphate or phosphonate or phosphinate groups or acids thereof, hydroxamate groups or acids thereof, silane or silanol groups, and combinations thereof and optionally hydrophobic groups, and a container of collector, wherein said collector comprises a compound selected from alkoxycarbonyl alkyl dithiocarbamate, mercaptobenzothiazole, dialkyl dithiocarbamate, diaryl or dialkyl dithiophosphate, dialkyl dithiophosphinate, alkoxycarbonyl alkyl thionocarbamate, allyl alkyl thionocarbamate, allyl alkyl xanthate ester, dialkyl thionocarbamate, and combinations thereof.

Yet a further aspect relates to a kit for improving recovery of value minerals from sulfide or precious metal containing ores that contain Mg-silicate, are slime forming or contain clay, said kit for use in acidic conditions comprising: a container of froth phase modifier, wherein said froth phase modifier is a polymer comprising at least one functional group selected from the group consisting of sulfonate groups or acids thereof, phosphate or phosphonate or phospinate groups or acids thereof, hydroxamate groups or acids thereof, silane or silanol groups, and combinations thereof, and optionally one or more hydrophobic group, and a container of collector, wherein said collector comprises a compound selected from alkoxycarbonyl alkyl dithiocarbamate, mercaptobenzothiazole, dialkyl dithiocarbamate, diaryl or dialkyl dithiophosphate, dialkyl dithiophosphinate, alkoxycarbonyl alkyl thionocarbamate, allyl alkyl thionocarbamate, allyl alkyl xanthate ester, dialkyl thionocarbamate, and combinations thereof.

These and other objects, features and advantages of this invention will become apparent from the following detailed description of the various aspects of the invention taken in conjunction with the accompanying Examples.

DETAILED DESCRIPTION OF CERTAIN EMBODIMENTS OF THE INVENTION

The disclosed subject matter relates to a process for enhancing the recovery of sulfide and precious metal value minerals from sulfide and precious metal containing ores, said ores containing Mg-silicates, slime forming minerals and/or clay using a froth flotation process, and the flotation reagents used therein. Enhancement of recovery generally refers to increasing the quantity of value minerals recovered during the froth flotation process, and/or maintaining or increasing the quality of the value minerals recovered. Typically, when utilizing froth phase modifiers and under alkaline conditions a monovalent ion modifier enhancing agent, as discussed herein, recovery of value minerals is enhanced by 0.1 to 90 percentage points as compared to recovery of value minerals in processes that do not utilize polymeric froth phase modifiers and under alkaline conditions, monovalent ion modifier enhancing agents. In another example recovery of value minerals is enhanced by 1 to 80 percentage points as compared to recovery of value minerals in processes that do not utilize the processes and reagents of the present invention. In another example recovery of value minerals is enhanced by 5 to 50 percentage points as compared to recovery of value minerals in processes that do not utilize the processes and reagents of the present invention. In another example recovery of value minerals is enhanced by 10 to 40 percentage points as compared to recovery of value minerals in processes that do not utilize the processes and reagents of the present invention. Additionally these polymer froth phase modifiers when used with or without the monovalent ion modifier enhancing agents allow processing at high solids and/or in sea water, contaminated and recycled water.

In general, ores contain, inter alia, both "value" and "non-value" minerals. In this context, the term "value" mineral refers to the metal, mineral or minerals that are the primary object of the flotation process, i.e., the metals and minerals from which it is desirable to remove impurities. The term "non-value" mineral refers to the mineral or minerals for which removal from the value mineral is desired, i.e., impurities in the value mineral. A non-value mineral is not necessarily discarded, and may be considered a value mineral in a subsequent process.

While any ore may be subjected to processes described herein, the disclosed subject matter typically pertains to base metal sulfide ores and precious metal ores that contain certain silicates, such as Mg-bearing silicates, slime-forming minerals such as slime-forming silicates, and/or clays, which are referred to herein as "ores containing Mg-silicates, slime forming minerals and/or clay". Examples of such ores include, but are not limited to, Cu—Mo ores, Cu—Au ores, primary Au ores, platinum group metal (PGM) ores, Cu ores, Ni ores, and complex polymetallic ores containing Pb, Zn, Cu and Ag. More specific examples of ores include ores containing certain Mg-silicates and clay minerals, such as serpentines, amphiboles, actinolite, chrysotile, tremolite, biotite, chlorite, sericite, and clay minerals. The amounts of such silicates vary from ore to ore, but typical ranges are about 1% to about 80% by weight of the ore.

One example of a froth flotation process includes crushing a sulfide or precious mineral containing ore to form crushed ore (referred to herein in as the "pre-grinding" or the "pre-grind" stage), and then grinding the crushed ore particles in a grinding mill, thereby forming a slurry including water and ground ore (referred to as the "grinding stage"). The slurry containing the ground ore is then sent to the "conditioning stage" where the ground ore is conditioned in a conditioner. The ground ore is subjected to a flotation process by passing air through the slurry in flotation cells or a bank of flotation cells to cause flotation of the desired minerals which are collected in launders (referred to as the "flotation stage").

As one of ordinary skill in the art will appreciate, a froth flotation process may include more than one stage of grinding, conditioning and flotation. Thus, the flotation concentrate from the first stage (referred to as "roughers" or "rougher-scavengers") may be ground further and refloated in a circuit referred to as "cleaners". The cleaners may subject the concentrate of the first stage to further grinding, conditioning and flotation stages. Alternatively, the concentrate from the first stage may be refloated without further grinding.

The tails from the cleaners may be refloated in a circuit referred to as "cleaner-scavengers". It is envisioned that the disclosed subject matter encompasses addition of froth phase modifiers, monovalent ion modifier enhancing agents and collectors at any stage of the process, i.e., addition of the froth phase modifier (and/or monovalent ion modifier enhancing agent and/or collector) in some instances may not be done until the second (or third) grinding stage, conditioning stage, or flotation stage.

Flotation reagents, which include collectors, frothers, pH regulators, froth phase modifiers, dispersants, depressants, and the like, may be added to the crushed ore and/or ground ore during the process at any or all of the stages of the froth flotation process. Typically the flotation reagents are added to at least one of the crushed ore, the ground ore, and combinations thereof.

Majority of the sulfide or precious metal flotation processes are carried out under basic (alkaline) conditions and in those cases a monovalent ion modifier enhancing agent can be used with the froth phase modifiers disclosed herein, however under certain acid conditions, a froth phase modifier polymer comprising at least one functional group selected from the group consisting of sulfonate groups or acids thereof, phosphate or phosphonate or phospinate groups or acids thereof, hydroxamate groups or acids thereof, silane or silanol groups and combinations thereof, and optionally one or more hydrophobic group is used.

As used herein, the term "add" or any variation thereof, means any method or process that can be used to bring two or more items or compounds together. The term "add" or any variation thereof, as used herein, encompasses any process that involves mixing, intermixing, combining, incorporating, blending, and the like. The term "add" is not limited to a certain sequence of addition of one item or compound to another.

As used herein, the term "froth phase modifier" means any reagent that may improve the properties of the froth phase and thereby enhance separation and recovery of value minerals, as well as reagents that may have beneficial effects in the pulp or slurry phase such as viscosity reduction of the slurry, depression or dispersion of certain silicates, and the like. The term "froth phase modifier" encompasses inter alia, reagents that have more than one function or purpose in the froth flotation process, e.g., act as a modifier of the froth phase and a depressant or a dispersant.

A froth phase modifier and/or a monovalent ion modifier enhancing agent may be added to the process at the pre-grind stage, the grinding stage, the conditioning stage, the flotation stage, or a combination thereof. In alkaline process conditions, a monovalent ion modifier enhancing agent can be added with the froth phase modifier polymer or separately, provided that when it is added with the polymer it is present in enough excess to neutralize the functional groups on the polymer and alter the pH of the circuit. One skilled in the art will appreciate that a collector may be added in any stage of the process. In one embodiment, a collector may be added to the process either separately from or simultaneously with the froth phase modifier at the pre-grind stage, the grinding stage, the conditioning stage, the flotation stage, or combinations thereof. Similarly, frothers, pH regulators, dispersants and depressants, if used, can be added to the process at any one or more of the following stages: pre-grind, grinding, conditioning, and flotation.

In one aspect, a froth phase modifier and a monovalent ion modifier enhancing agent is utilized in the process wherein the process is carried out under alkaline conditions, while in another aspect a froth phase modifier comprising a polymer comprising at least one functional group selected from the group consisting of sulfonate groups or acids thereof, phosphate or phosphonate or phospinate groups or acids thereof, hydroxamate groups or acids thereof, silane or silanol groups and optionally hydrophobic groups, or combinations thereof is utilized in the process, wherein the process is carried out under acidic conditions. Another aspect includes a collector as flotation reagents. Other reagents such as modifiers, frothers, pH regulators, depressants, dispersants, activators, and the like may be used as needed, e.g., modifiers such as ammonium sulfide, copper sulfate, lead nitrate, soda ash, organic dyes, tannins, dextrin, and starch; frothers such as aliphatic alcohols (such as Methylisobutyl Carbinol (MIBC)), poly(ethylene) or poly(propylene) glycols and their monoethers, alkoxy compounds (such as triethoxybutane), ketones, aldehydes, esters, pine oil, and cresols; depressants such as sodium cyanide or polysaccharide; dispersants such as sodium silicate or carboxymethyl cellulose; and activators such as copper sulfate.

While not wanting to be bound by any particular theory, the superior performance of the froth phase modifiers and under alkaline conditions monovalent ion modifier enhancing agents may be attributed to their breaking the complex froth structure caused by silicates and modulating froth viscosity so that value separation from unwanted gangue silicate minerals can occur.

Froth phase modifiers useful in the froth flotation process include, but are not limited to, water-soluble, water miscible or water dispersible polymers having a molecular weight between about 1000 to about 1,000,000. In one example, the molecular weight range of the froth phase modifier is 3000 to about 300,000. In another example, the molecular weight range of the froth phase modifier is 5000 to 50,000.

The reagents of the present invention can be useful in a large variety of water chemistries including but not limited to sea, brackish or contaminated or recycled water, apart from allowing plants to process at high solids density which allows for increased throughput.

Examples of froth phase modifiers include, but are not limited to, polymers comprising at least one functional group selected from the group consisting of carboxyl groups or groups that when hydrolyzed become carboxyl groups, sulfonate groups or acids thereof, phosphate or phosphonate or phosphinate groups or acids thereof, hydroxamate groups or acids thereof, silane or silanol groups, and combinations thereof, and optionally hydrophobic groups.

The term hydrolyzed, as used herein, means a chemical reaction or process in which a chemical compound or group is broken down by reaction with water.

Examples of carboxyl acid (or salt thereof)-containing polymers are well known in the art and include, but are not limited to, ethylenically unsaturated carboxylic acids, ethylenically unsaturated carboxylic acid anhydrides, salts of unsaturated carboxylic acids, and their mixtures, which include, but are not limited to: acrylic acid, methacrylic acid, ethacrylic acid, fumaric acid (also known as maleic acid), itaconic acid, crotonic acid and anhydrides and salts thereof.

Examples of sulfonate containing polymers are well known in the art and include, but are not limited to, ethylenically unsaturated sulfonic acids, salts of unsaturated sulfonic acids, which include, for example: 2-acrylamido-2-methyl-1-propanesulfonic acid, vinyl sulfonic acid, styrene sulfonic acid.

Examples of phosphonate containing polymers are well known in the art and include, but are not limited to, ethylenically unsaturated phosphonic acids, salts of unsaturated phosphonic acids, and their mixtures, which include, for example: 2-acrylamido-2-methyl-1-propanephosphonic acid, vinyl phosphonic acid, β-styrylphosphonic acid, and anhydrides thereof.

Examples of phosphinate containing polymers are known in the art and include, but are not limited to, ethylenically unsaturated phosphinic acids, salts of unsaturated phosphinic acids, and their mixtures, which include, for example: allylphosphinic acid, and anhydrides thereof.

Examples of hydroxamate containing polymers are well known in the art and include, but are not limited to, ethylenically unsaturated hydroxamic acids, salts of unsaturated hydroxamic acids, and their mixtures, which include, for example: acrylamido hydroxamic acid, methacrylamido hydroxamic acid, and polymers containing certain groups that can be converted to hydroxamic acid or salt thereof.

Examples of silane or silanol containing polymers are well known in the art and include, but are not limited to, ethylenically unsaturated trialkoxysilane, salts of unsaturated trialkoxysilane silane, and their mixtures, which include, for example: vinyltrimethoxysilane, 3-(triethoxysilyl)propylacrylamide, 3-(triethoxysilyl)propylacrylate.

Examples of hydrophobic groups are well known in the art, and include, but are not limited to, aromatic hydrocarbons and C3-C18 saturated or unsaturated, linear or nonlinear or cyclic hydrocarbons, alkyl or aryl esters, alkyl or aryl ethers. Examples of esters are well known in the art and include, but are not limited to, vinyl acetate, vinyl formate, vinyl propionate, vinyl butyrate, and vinyl isobutyrate. Examples of ethers are also well known in the art and include, but are not limited to, butyl vinyl ether, ethyl vinyl ether, methyl vinyl ether, N-hexyl acrylamide, N-propyl acrylamide, N,N-dipropyl acrylamide, and the like.

Particularly useful froth phase modifiers include, but are not limited to, polymers containing monomer units of allyl sulfonate, maleic anhydride, vinyl acetate, styrene, monomer units containing a silane, silanol, a monomer unit bearing a hydroxamate, monomer unit bearing a hydrocarbyl group, vinyl phosphanate, and combinations thereof.

Specific examples of froth phase modifiers include, but are not limited to poly(styrene-co-maleic anhydride-co-acrylic acid), poly(vinyl acetate-co-maleic anhydride), poly(N-vinylpyrrolidone-co-maleic anhydride), poly(butyl vinyl ether-co-maleic anhydride), silane- and tert-octylamine modified poly(N-vinylpyrrolidone-co-maleic anhydride), poly(allyl sulfonate-co-maleic anhydride), poly(styrene-co-maleic anhydride-co-2-acrylamido-2-methyl-1-propanesulfonic acid), hydroxamated poly(acrylamide-co-vinylphosphonic acid), poly(acrylic acid-co-vinylphosphonic acid), poly(2-acrylamido-2-methyl-1-propanesulfonic acid-co-vinylphosphonic acid), poly(styrene-co-maleic anhydride-co-2-acrylamido-2-methyl-1-propanesulfonic acid), hydroxamated poly(acrylamide-co-vinylphosphonic acid), poly(acrylic acid-co-vinylphosphonic acid), poly(2-acrylamido-2-methyl-1-propanesulfonic acid-co-vinylphosphonic acid), poly(styrene-co-maleic anhydride), 3-aminopropyltriethoxysilane modified poly(styrene-co-maleic anhydride), 3-Aminopropyltriethoxysilane modified poly(styrene-co-maleic anhydride-co-acrylic acid), poly(styrene-co-acrylic acid), hydroxamated poly(acrylamide-co-2-acrylamido-2-methyl-1-propanesulfonic acid), and combinations thereof. It is contemplated that more than one type of froth phase modifier may be added to the froth flotation process. It is also contemplated that the froth phase modifiers may be used with other modifiers known in the art, and with pH regulators and activators.

Examples of monovalent ion modifier enhancing agents can be inorganic or organic and include but are not limited to NaOH, KOH, $NH_4OH$, LiOH, tetramethyl ammonium hydroxide, tetraethylammonium hydroxide, and mixtures thereof. Monovalent when used in the context of this invention means when introduced into the aqueous phase these compounds disassociate into monovalent cations and anions.

As noted above, froth phase modifiers and where appropriate under alkaline conditions, monovalent ion modifier enhancing agents, may be added at any stage of the froth flotation process. In one example, a froth phase modifier is added to the crushed ore during the pre-grinding process. In another example, the froth phase modifier and/or the monovalent ion modifier enhancing agent is added to the ground ore, which is present in the slurry formed during the grinding stage, i.e., the froth phase modifier and/or the monovalent ion modifier enhancing agent is added into the grinding mill during the grinding stage. In another example, a froth phase modifier and/or the monovalent ion modifier enhancing agent may be added to the ground ore during the conditioning stage or the flotation stage, or both, by adding the froth phase modifier and/or the monovalent ion modifier enhancing agent to the ground ore in a conditioner or flotation cell. The froth phase modifier and/or the monovalent ion modifier enhancing agent may also be added in all of the stages or in any combination thereof, e.g., the froth phase modifier and/or the monovalent ion modifier enhancing agent may be added in both the grinding stage and the conditioning stage.

The froth phase modifiers and/or the monovalent ion modifier enhancing agent are added by any method acceptable to add reagents to a froth flotation process and may be added to the process in any form. In one example, the froth phase modifier and/or the monovalent ion modifier enhancing agent is added in a powder form. In another example, the froth phase modifier and/or the monovalent ion modifier enhancing agent is dissolved in water prior to addition to the process. In yet another example, the sodium, potassium or ammonium salts of the froth phase modifier are formed and added to the process.

The froth phase modifiers and/or the monovalent ion modifier enhancing agent are added to the process in an amount effective to enhance the recovery of value minerals from Mg-silicate containing ores, slime forming ores, or clay containing ores. The amount of froth phase modifier and/or the monovalent ion modifier enhancing agent added to the process will vary from process to process and is dependent on a number of factors, including, but not limited to: the type of ore, the amount of ore, the value mineral, the type and amount of silicate minerals present in the ore, and the like. In one example, the amount of froth phase modifier and/or the monovalent ion modifier enhancing agent added to the process is between about 25 g to about 5000 g per ton of ore. In another example the amount may be about 50 g to about 2000 g per ton of ore. In yet another example, the amount may be about 100 g to about 500 g per ton of ore.

The froth phase modifier and/or the monovalent ion modifier enhancing agent may be added to the froth flotation process in conjunction with another reagent such as a dispersant, a pH regulator, a depressant, an activator, collector, frother, and combinations thereof. Examples of dispersants, depressants, pH regulators and activators include, but are not limited to: lime, sodium carbonate, sodium silicate, carboxymethyl cellulose, guar gum, lignin sulfonate, copper sulfate, polyacrylate, sodium polyphosphates, sodium stearamidopropyl dimethyl 2-hydroxyethyl ammonium nitrate, and the like. The reagents may be added in conjunction with the froth flotation modifier in either the grinding stage or the flotation stage.

Flotation reagents useful in enhancing the recovery of value minerals include collectors. Collectors may be added during any stage of the froth flotation process. For example, the collector may be added during the pre-grinding stage, the grinding stage, the conditioning stage, the flotation stage, or combinations thereof.

Typically, the collector is added to the process simultaneously with or after the addition of the froth phase modifier to the process. In one example, the collector is added to the crushed ore in the pre-grinding stage after the addition of the froth phase modifier to the crushed ore. Alternatively, the collector and froth phase modifier are added to the crushed ore simultaneously.

In another example, the collector is added to the ground ore during the grinding stage before or after the froth phase modifier has been added (either in the pre-grind stage or the grinding stage). Alternatively, the collector is added to the ground ore simultaneously with the froth phase modifier in the grinding stage.

In yet another example, the collector is added to the ground ore present in the conditioning stage before or after the froth phase modifier has already been added (either in the pre-grind stage, the grinding stage, or the conditioning stage). Alternatively, the collector may be added simultaneously with the froth phase modifier during the conditioning stage.

In a further example, the collector may be added to ground ore present in the flotation stage after the froth phase modifier has already been added (either in the pre-grind stage, the grinding stage, the conditioning stage or the flotation stage). Alternatively, the collector may be added simultaneously with the froth phase modifier during the conditioning stage.

The collector may be added in more than one stage of the froth flotation process. For example, the collector may be added to the crushed ore particles at the pre-grind stage and also to the ground ore during the conditioning stage. Another example includes adding the collector to the ground ore at the grinding stage and adding the collector to the ground ore at the conditioning stage. Yet another example includes adding the collector to the ground ore at the grinding stage and adding the collector to the ground ore at the flotation stage. Another example includes adding the collector to the ground ore at the conditioning stage and adding the collector to the ground ore at the flotation stage. Other combinations, while not specifically mentioned, are contemplated. As discussed above, all of these examples may include simultaneous addition of the collector with the froth phase modifier or addition of the collector before/after addition of the froth phase modifier.

As one of ordinary skill in the art will appreciate, collectors are generally known and used in froth flotation processes. While any collector, or combinations of collectors, known in the art may be utilized in the froth flotation process described herein, there are certain collectors that have been found to enhance the recovery of value minerals from certain ores when used with froth phase modifiers and/or monovalent ion modifier enhancing agent. In one example, collectors may include, but are not limited to, formulations that contain alkoxycarbonyl alkyl dithiocarbamate, mercaptobenzothiazole, dialkyl dithiocarbamate, diaryl or dialkyl dithiophosphate, dialkyl dithiophosphinate, alkoxycarbonyl alkyl thionocarbamate, allyl alkyl thionocarbamate, allyl alkyl xanthate ester, dialkyl thionocarbamate, and combinations thereof.

In another example, collector formulations that contain a collector selected from the group of alkoxycarbonyl alkyl dithiocarbamate, mercaptobenzothiazole, dialkyl dithiocarbamate, diaryl or dialkyl dithiophosphate, dialkyl dithiophosphinate, alkoxycarbonyl alkyl thionocarbamate, allyl alkyl thionocarbamate, allyl alkyl xanthate ester, dialkyl thionocarbamate, and combinations thereof, may be used in conjunction with alkyl xanthate or other collectors selected from a group of alkyl mercaptan, dialkyl monothiophosphate, diaryl monothiophosphate, dialkyl sulfide, alcoxycarbonyl alkyl thiourea, dialkyl xanthogen formate, diphenyl thiourea, diphenyl guanidine, alkyl hydroxamic acids, and combinations thereof.

The collectors used herein may include a blend of one or more of the compounds discussed above in any suitable ratio. Typically, the blend includes one or more compounds selected from alkoxycarbonyl alkyl dithiocarbamate, mercaptobenzothiazole, dialkyl dithiocarbamate, dialkyl or diaryl dithiophosphate, dialkyl or diaryl monothiophosphate, alkoxycarbonyl alkyl thionocarbamate, allyl alkyl thionocarbamate, dialkyl thionocarbamate, and allyl alkyl xanthate ester, wherein the individual compounds are present in the collector in an amount from 1 wt. % to about 90 wt. % based on the total weight of the collector. In another example, the individual compounds are present in the collector in an amount from 5 wt. % to about 70 wt. % based on the total weight of the collector. In yet another example, the individual compounds are present in the collector in an amount from about 10 wt. % to about 50 wt. % based on the total weight of the collector.

One example of a collector is a blend of alkoxycarbonyl alkyl dithiocarbamate, dialkyl dithiophosphate and alkoxycarbonyl alkyl thionocarbamate. Another example of a collector is a blend of mercaptobenzothiazole, sodium dialkyl dithiocarbamate and sodium dialkyl dithiophosphate. Yet another example of a collector is a blend of alkoxycarbonyl alkyl thionocarbamate, allyl alkyl xanthate ester, dialkyl thionocarbamate and aromatic hydrocarbon oil. A further example of a collector is a blend of diaryl dithiophosphate and dialkyl monothiophosphate.

The collectors are added to the process in any manner that is suitable for adding a reagent to a froth flotation process and is added in an amount effective to enhance the recovery of value minerals from an ore. The amount will vary from process to process and is dependent on a number of factors, including, but not limited to: the type of ore, the amount of ore, the value mineral(s), the type and amount of silicate minerals present in the ore, and the like. In one example, the amount of collector added to the process is between about 5 g to about 500 g per ton of ore. In another example the amount of collector is between about 10 g to about 200 g per ton of ore. And in yet another example, the amount of collector is 20 g to 100 g per ton of ore.

The reagents disclosed herein can be used in froth flotation processes under either basic (alkaline) conditions (pH typically greater than 7), acidic conditions (pH typically less than 7), or at neutral pH, to improve value sulfide and precious metal mineral recovery as dictated by the type of ore, the mineralogy and minerals designated as values. In the mineral processing field, acidic and basic can also be described in an alternative way. For example, when the natural pH of the ground pulp (without any reagents) is say 8.2; then acidic conditions or acidic circuit would be wherein pH of the pulp is reduced from 8.2 to say 7.5 by adding an acid; and basic or alkaline circuit would be wherein pH of the pulp is increased from 8.2 to say 8.5 by adding a base, most commonly lime.

When the froth flotation process is carried out under acidic conditions, the froth phase modifiers, collectors, and other reagents discussed above may be added to the process during any stage as discussed above. While any of the above-mentioned froth phase modifiers, collectors and other reagents may be added to the process under acidic conditions, it is contemplated that froth phase modifiers containing a sulfonic acid group or sulfonate group or phosphonic acid or phosphinate or phosphonate or hydroxamate group may increase recovery of value minerals from the process.

Although the inventors do not subscribe to or wish to be bound by any proposed theories or observations, in general certain sulfide minerals such as copper sulfides and molybdenite can be floated selectively under alkaline conditions, while certain other sulfides such as pyrite, pyrrhotite, arsenopyrite float less effectively under these conditions. Under acidic conditions, most of the sulfide minerals float effectively. For some ores, such as Cu ores, Cu—Mo ores, Cu—Au ores, and Ni ores, selective flotation of value sulfides and precious metals may be necessary, while rejecting gangue sulfides such as pyrite, pyrrhotite and arsenopyrite in addition to rejecting the problem silicates. For some other ores, such as the primary Au ores, PGM ores, certain Ni ores, the objective may be to recover almost all of the sulfides and precious metals into a single concentrate or bulk concentrate in a process referred to sometimes as bulk flotation, while rejecting the problem gangue silicates and other non-sulfide gangue. Those skilled in the art will be able to determine the conditions necessary to achieve a given objective for value separation and recovery.

When the flotation process is conducted under acidic conditions, the froth phase modifiers and collectors can improve recovery of all base metal sulfide minerals and all precious metal values that are completely or partially liberated and are not completely encapsulated in the gangue silicate matrix.

In one example, the flotation process is conducted under acidic conditions by adding a froth phase modifier comprising at least one polymer comprising at least one functional group selected from the group consisting of sulfonate groups or acids thereof, phosphate or phosphonate or phospinate groups or acids thereof, hydroxamate groups or acids thereof, silane or silanol groups and optionally hydrophobic groups, or combinations thereof. The froth phase modifier can be added during any stage of the froth flotation process, but more typically it is added to the ground ore in the conditioning stage or the flotation stage. In one example, addition of the froth phase modifier may occur in the conditioning stage only or in the flotation stage only or in both stages. It is contemplated that the collector may be added to the process simultaneously with the froth phase modifier at any stage of the process. Acidic conditions are typically used for processing primary gold ores, certain Ni ores and in a few Cu and polymetallic ores.

Any compound having acidic properties may be utilized as a pH modifier in the froth flotation process. Examples of acidic compounds include, but are not limited to, sulfuric acid ($H_2SO_4$), citric acid, oxalic acid, nitric acid, sulfurous acid, hydrochloric acid (HCl), nitric acid (HNO3), phosphoric acid (H3PO4) and sulfamic acid. In a preferred embodiment, for example, sulfuric acid is used as the pH modifier in the froth flotation process.

The acidic compound is added in the process in an amount effective to obtain acidic processing conditions, i.e., typically pH below 7, or below the natural pH of the pulp without any reagent. In one example the amount of acid is in the range of about 1 kg to about 30 kg per ton of ore. In another example, the amount of acid is in the range of about 3 kg to about 20 kg per ton of ore. In yet another example, the amount is in the range of about 5 kg to 15 kg per ton of ore.

Another aspect relates to a kit for improving recovery of value minerals from a sulfide or precious metal containing ore. The kit for use under alkaline conditions includes a container of froth phase modifier, a container of monovalent ion modifier enhancing agent and a container of collector as described herein. The kit may also include containers of other reagents and/or additives, such as about 10 kg per ton of ore. A kit for improving recovery of value minerals from a sulfide or precious metal containing ore for use under acid conditions includes a container of froth phase modifier with at least one polymer comprising functional groups selected from the group consisting of sulfonate groups or acids thereof, phosphate or phosphonate or phosphinate groups or acids thereof, silane and silanol groups, and mixtures thereof.

The following examples are provided to assist one skilled in the art to further understand certain embodiments of the present invention. These examples are intended for illustration purposes and are not to be construed as limiting the scope of the various embodiments of the present invention.

EXAMPLES

Preparation of Froth Phase Modifiers

Example 1

Preparation of Poly(styrene-co-maleic anhydride-co-acrylic acid)

Preparation of the terpolymer of styrene, maleic anhydride, and acrylic acid is as follows: 39.58 g of maleic anhydride is dissolved in 238.61 g toluene in a 32 oz. container. 42.04 g of styrene and 19.39 g of acrylic acid are then added into the solution and mixed well to form the monomer solution. 650 g of toluene is charged into the reactor and purged with nitrogen while heating up to 85° C. The nitrogen purge (or blanket) is kept throughout the entire polymerization process. After purging nitrogen for 30 minutes 9.85 g of DiLauroyl Peroxide, available as Luperox LP from Atofina Chemicals, Inc., Philadelphia, Pa., is added into the reactor. The monomer solution is immediately added to the reactor over a period of 90 minutes. Keep the reaction temperature at 85° C. for the first 60 minutes then increase to 90° C. and keep at 90° C. until all monomer solution is charged. After charging the monomer solution, the reaction temperature is raised to 95° C. and kept at 95° C. for 1 hour. Heating is stopped and the reaction is allowed to cool to below 40° C. before discharging. The product is washed twice with toluene and dried under vacuum. The molecular weight (MW) of this polymer is approximately 25000.

Example 2

Preparation of Poly(vinyl acetate-co-maleic anhydride)

Preparation of the copolymer of vinyl acetate and maleic anhydride is as follows: 64.55 g of maleic anhydride is dissolved in 356.93 g toluene in a jacketed reactor. Under agitation 56.67 g of vinyl acetate is added to the reactor, followed by addition of 1.86 g of 2,2'-Azobis(2,4-dimethyl valeronitrile). The reactor is sparged with nitrogen for 40 minutes and is then heated to 52° C. to initiate the polymerization. Keep the nitrogen purge (or blanket) throughout the entire polymerization process. Let the temperature rise until exotherm is over. Let the reaction cool to 60° C. and keep at 60° C. for 10 hours. Heating is stopped and the reaction is allowed to cool to room temperature before discharge. The product is washed twice with toluene and dried under vacuum. The molecular weight of this polymer is approximately 44000.

Example 3

Preparation of Poly(N-vinylpyrrolidone-co-maleic anhydride)

Preparation of the copolymer of N-vinylpyrrolidone and maleic anhydride is as follows: 42.61 g of maleic anhydride is dissolved in 212.49 g toluene in a 32 oz. container. 48.3 g of N-vinylpyrrolidone is then added into the solution and mixed well to form the monomer solution. 585.47 g of toluene is charged into the reactor and purged with nitrogen while heating up to 80° C. The nitrogen purge (or blanket) is kept throughout the entire polymerization process. After purging nitrogen for 30 minutes, add 9.28 g of Luperox LP into the reactor and immediately start the addition of monomer solution over a period of 100 minutes. Keep the reaction temperature at 85° C. After charging the monomer solution the reaction temperature is raised to 90° C. and kept at 90° C. for ½ hour. Add 1.86 g Luperox LP and raise the reaction temperature to and keep at 95° C. for 1 hour. Stop heating and let the reaction cool to below 40° C. before discharging. The product is washed twice with toluene and dried under vacuum. The molecular weight of this polymer is approximately 7600.

Example 4

Preparation of Poly(butyl vinyl ether-co-maleic anhydride)

Preparation of the copolymer of butyl vinyl ether and maleic anhydride is as follows: 49.97 g of maleic anhydride is dissolved in 363.42 g toluene in a 32 oz. container. 51.56 g of butyl vinyl ether is added into the solution and mixed well to form the monomer solution. 524.74 g of toluene is charged into the reactor and purged with nitrogen while heating up to 65° C. The nitrogen purge (or blanket) is kept throughout the entire polymerization process. After purging nitrogen for 30 minutes, 4.12 g of 2,2'-Azobis(2,4-dimethyl valeronitrile) is added into the reactor. Immediately start the addition of monomer solution to the reactor over a period of 70 minutes. Keep the reaction temperature between 63° C. to 65° C. Thirty (30) minutes after the onset of monomer addition, add 2.06 g of 2,2'-Azobis(2,4-dimethyl valeronitrile). After 30 minutes, add another 2.06 g of 2,2'-Azobis (2,4-dimethyl valeronitrile). 30 minutes after charging all monomer solution, add another 2.06 g of 2,2'-Azobis(2,4-dimethyl valeronitrile). Raise the reaction temperature to and keep it at 68° C. for 4 additional hours. Stop heating and let the reaction cool to below 40° C. before discharging. The product is washed twice with toluene and dried under vacuum. The molecular weight of this polymer is approximately 34000.

Example 5

Preparation of Silane- and tert-octylamine modified Poly(N-vinylpyrrolidone-co-maleic anhydride)

The polymer is prepared from a copolymer of N-vinyl pyrrolidone and maleic anhydride with the same process as in Example 3. The copolymer is further modified with N-tert-octylamine and (3-aminopropyl)triethoxysilane as follows: 7 g of poly(N-vinyl pyrrolidone-co-maleic anhydride) with 84.9% polymer solids (the balance is toluene) is dissolved in 29.4 g N,N-dimethylformamide in a 4-oz glass container. Purge the solution for 15 minutes before adding the modifying solution. The modifying solution is prepared by adding 1.35 g (3-aminopropyl)triethoxysilane and 2.09 g N-tert-octylamine is added into 8.39 g N,N-dimethylformamide under mixing. The modifying solution is then slowly added into the polymer solution under mixing to a homogeneous solution. The solution is heated to 90° C. for 1 hour. Let the product cool to room temperature and discharge. The molecular weight of this polymer is approximately 8800.

Example 6

Preparation of Silane- and tert-octylamine modified Poly(N-vinylpyrrolidone-co-maleic anhydride)

This polymer is prepared in the same way as Example 5, except the amounts of N-tert-octylamine and (3-aminopropyl)triethoxysilane are 1.60 g and 1.35 g, respectively. The molecular weight of this polymer is approximately 8800.

Example 7

Preparation of Poly(Allyl sulfonate-co-maleic anhydride)

98.1 g of maleic anhydride is added to 720 g of a 20% solution of sodium allyl sulfonate in the reactor. The monomer solution is purged with nitrogen while heating up to 100-105° C. to distill off water. After about 210 g of water has been removed, 62.5 g of a 26.7% solution of ammonium persulfate is charged into the reactor over 5.5 hours. The polymerization is continued for 30 minutes at 100-103° C. after all ammonium persulfate has been charged. The product is discharged when the temperature cools to below 40° C. The polymer MW is around 2,000.

Example 8

Preparation of Poly(styrene-co-maleic anhydride-co-2-acrylamido-2-methyl-1-propanesulfonic acid)

Preparation of the terpolymer of styrene, maleic anhydride, and 2-acrylamido-2-methyl-1-propanesulfonic acid (AMPS) is as follows: Charge 11.27 g of maleic anhydride and 277.73 g of dimethylformamide (DMF) into the reactor. Stir to dissolve maleic anhydride then add 11.97 g of styrene and 71.46 g of AMPS. Mix all monomers to form a homogeneous monomer solution then add 1.93 g of AIBN and mix well. Purge the monomer solution with nitrogen for 45 minutes and heat at 75 C for 6 hours. Keep the nitrogen purge throughout the entire polymerization process. Stop heating and let the reaction cool to below 40° C. Discharge and precipitate the polymer into isopropanol. Wash, filter and dry the polymer under vacuum. This polymer is dissolved in a caustic solution before use.

Example 9

Preparation of poly(acrylamide-co-vinylphosphonic acid) and its hydroxamation (9a) Preparation of poly(acrylamide-co-vinylphosphonic acid)

Prepare monomer solution by charging 144.4 g of vinylphosphonic acid and 63.35 g of de-ionized water into a beaker. Under agitation add 103.72 g 50% sodium hydroxide to neutralize the vinylphosphonic acid. Keep the solution temperature below 32° C. during the neutralization process. Adjust the solution pH to about 6.0 and add 173.23 g acrylamide. Under agitation dissolve the acrylamide to form a homogeneous monomer solution and purge it with nitrogen for at least 45 minutes. Charge 244.67 g of de-ionized water into the reactor, purge it with nitrogen for 45 minutes and at the same time heat the reactor to 60° C. Keep nitrogen purge for the entire polymerization process. After 45 minutes of nitrogen purge start charging 22 g of a 32.34% ammonium persulfate solution and 22.82 g of a 29.15% sodium metabisulfite solution (the redox initiators) simultaneously into the reactor through a syringe pump over 130 minutes. The monomer solution is charged 10 minutes after the onset of initiators charge and is added over 80 minutes. Allow the reaction to rise to between 65° C. and 70° C. and stay in that temperature range for one additional hour after finishing the addition of the redox initiators. Stop heating and let the reaction cool to room temperature before conducting the hydroxamation.

(9b) Hydroxamation of poly(acrylamide-co-vinylphosphonic acid)

Prepare hydroxylamine solution by adding 354.71 g of a 30% hydroxylamine sulfate solution into a beaker. Add 10.35 g of anhydrous sodium thiosulfate and stir until all sodium thiosulfate dissolved. Add 124.47 g of a 50% sodium hydroxide solution slowly to the solution under agitation. Keep the solution temperature below 25° C. with an ice-water bath during the addition of sodium hydroxide solution. Stir the hydroxylamine solution prepared for about 20 minutes and add it slowly into the poly(acrylamide-co-vinylphosphonic acid) solution prepared in (9a) in the reactor under agitation and under nitrogen purge. After adding the hydroxylamine solution keep stirring under nitrogen for 20 minutes at ambient temperature and then discharge the product.

Example 10

Preparation of poly(acrylic acid-co-vinylphosphonic acid)

This copolymer is prepared with the same procedure as in (9a) except that acrylamide is replaced with acrylic acid.

Prepare monomer solution by charging 144.4 g of vinylphosphonic acid, 94.37 g of acrylic acid and 42.5 g of de-ionized water into a beaker. Under agitation add 207.45 g of a 50% sodium hydroxide to neutralize the acids. Keep the solution temperature below 32° C. during the neutralization process. Adjust the solution pH to about 6.0 and purge it with nitrogen for at least 45 minutes before charging into the reactor. Charge 244.67 g of de-ionized water into the reactor, purge it with nitrogen for 45 minutes and at the same time heat the reactor to 60° C. Keep nitrogen purge for the entire polymerization process. After 45 minutes of nitrogen purge start charging 22 g of a 32.34% ammonium persulfate solution and 22.82 g of a 29.15% sodium metabisulfite solution (the redox initiators) simultaneously into the reactor through a syringe pump over 130 minutes. The monomer solution is charged 10 minutes after the onset of initiators charge and is added over 80 minutes. Allow the reaction to rise to between 65° C. and 70° C. and stay in that temperature range for one additional hour after finishing the addition of the redox initiators. Stop heating and let the reaction cool to room temperature before discharging the product.

Example 11

Preparation of poly(2-acrylamido-2-methyl-1-propanesulfonic acid-co-vinylphosphonic acid)

This copolymer is prepared with the same procedure as in (9a) except that acrylamide is replaced with 2-acrylamido-2-methyl-1-propanesulfonic acid. Prepare monomer solution by charging 144.4 g of vinylphosphonic acid, 450 g of de-ionized water, and 271.43 g of 2-acrylamido-2-methyl-1-propanesulfonic acid into a beaker. Under agitation add 207.45 g of a 50% sodium hydroxide to neutralize the acids. Keep the solution temperature below 32° C. during the neutralization process. Adjust the solution pH to about 6.0 and purge it with nitrogen for at least 45 minutes before charging into the reactor. Charge 244.67 g of de-ionized water into the reactor, purge it with nitrogen for 45 minutes and at the same time heat the reactor to 60° C. Keep nitrogen purge for the entire polymerization process. After 45 minutes of nitrogen purge start charging 22 g of a 32.34% ammonium persulfate solution and 22.82 g of a 29.15% sodium metabisulfite solution (the redox initiators) simultaneously into the reactor through a syringe pump over 130 minutes. The monomer solution is charged 10 minutes after the onset of initiators charge and is added over 80 minutes. Allow the reaction to rise to between 65° C. and 70° C. and stay in that temperature range for one additional hour after finishing the addition of the redox initiators. Stop heating and let the reaction cool to room temperature before discharging the product.

Example 12

Preparation of Poly(styrene-co-maleic anhydride-co-2-acrylamido-2-methyl-1-propanesulfonic acid)

Preparation of the terpolymer of styrene, maleic anhydride, and 2-acrylamido-2-methyl-1-propanesulfonic acid (AMPS) is as follows: Charge 11.27 g of maleic anhydride and 277.73 g of dimethylformamide (DMF) into the reactor. Stir to dissolve maleic anhydride then add 11.97 g of styrene and 71.46 g of AMPS. Mix all monomers to form a homogeneous monomer solution then add 1.93 g of AIBN and mix well. Purge the monomer solution with nitrogen for 45 minutes and heat at 75° C. for 6 hours. Keep the nitrogen purge throughout the entire polymerization process. Stop heating and let the reaction cool to below 40° C. Discharge and precipitate the polymer into isopropanol. Wash, filter and dry the polymer under vacuum. This polymer is dissolved in a caustic solution before use.

Example 13

Preparation of poly(acrylamide-co-vinylphosphonic acid) and its hydroxamation Product (13a) Preparation of poly(acrylamide-co-vinylphosphonic acid)

Prepare monomer solution by charging 144.4 g of vinylphosphonic acid and 63.35 g of de-ionized water into a beaker. Under agitation add 103.72 g 50% sodium hydroxide to neutralize the vinylphosphonic acid. Keep the solution temperature below 32° C. during the neutralization process. Adjust the solution pH to about 6.0 and add 173.23 g acrylamide. Under agitation dissolve the acrylamide to form a homogeneous monomer solution and purge it with nitrogen for at least 45 minutes. Charge 244.67 g of de-ionized water into the reactor, purge it with nitrogen for 45 minutes and at the same time heat the reactor to 60° C. Keep nitrogen purge for the entire polymerization process. After 45 minutes of nitrogen purge start charging 22 g of a 32.34% ammonium persulfate solution and 22.82 g of a 29.15% sodium metabisulfite solution (the redox initiators) simultaneously into the reactor through a syringe pump over 130 minutes. The monomer solution is charged 10 minutes after the onset of initiators charge and is added over 80 minutes. Allow the reaction to rise to between 65° C. and 70° C. and stay in that temperature range for one additional hour after finishing the addition of the redox initiators. Stop heating and let the reaction cool to room temperature before conducting the hydroxamation.

(13b) Hydroxamation of poly(acrylamide-co-vinylphosphonic acid)

Prepare hydroxylamine solution by adding 354.71 g of a 30% hydroxylamine sulfate solution into a beaker. Add 10.35 g of anhydrous sodium thiosulfate and stir until all sodium thiosulfate dissolved. Add 124.47 g of a 50% sodium hydroxide solution slowly to the solution under agitation. Keep the solution temperature below 25° C. with an ice-water bath during the addition of sodium hydroxide solution. Stir the hydroxylamine solution prepared for about 20 minutes and add it slowly into the poly(acrylamide-co-vinylphosphonic acid) solution prepared in (13a) in the reactor under agitation and under nitrogen purge. After adding the hydroxylamine solution keep stirring under nitrogen for 20 minutes at ambient temperature and then discharge the product. The structure of the resulting copolymer, as determined by NMR spectroscopy, contains hydroxamate, carboxylate, amide, and phosphonate group.

Example 14

Preparation of poly(acrylic acid-co-vinylphosphonic acid)

This copolymer is prepared with the same procedure as in (13a) except that acrylamide is replaced with acrylic acid. Prepare monomer solution by charging 144.4 g of vinylphosphonic acid, 94.37 g of acrylic acid and 42.5 g of de-ionized water into a beaker. Under agitation add 207.45 g of a 50% sodium hydroxide to neutralize the acids. Keep the solution temperature below 32° C. during the neutralization process. Adjust the solution pH to about 6.0 and purge it with nitrogen for at least 45 minutes before charging into the reactor. Charge 244.67 g of de-ionized water into the reactor, purge it with nitrogen for 45 minutes and at the same time heat the reactor to 60° C. Keep nitrogen purge for the entire polymerization process. After 45 minutes of nitrogen purge start charging 22 g of a 32.34% ammonium persulfate solution and 22.82 g of a 29.15% sodium metabisulfite solution (the redox initiators) simultaneously into the reactor through a syringe pump over 130 minutes. The monomer solution is charged 10 minutes after the onset of initiators charge and is added over 80 minutes. Allow the reaction to rise to between 65° C. and 70° C. and stay in that temperature range for one additional hour after finishing the addition of the redox initiators. Stop heating and let the reaction cool to room temperature before discharging the product.

Example 15

Preparation of poly(2-acrylamido-2-methyl-1-propanesulfonic acid-co-vinylphosphonic acid)

This copolymer is prepared with the same procedure as in (13a) except that acrylamide is replaced with 2-acrylamido-2-methyl-1-propanesulfonic acid. Prepare monomer solution by charging 144.4 g of vinylphosphonic acid, 450 g of de-ionized water, and 271.43 g of 2-acrylamido-2-methyl-1-propanesulfonic acid into a beaker. Under agitation add 207.45 g of a 50% sodium hydroxide to neutralize the acids. Keep the solution temperature below 32° C. during the neutralization process. Adjust the solution pH to about 6.0 and purge it with nitrogen for at least 45 minutes before charging into the reactor. Charge 244.67 g of de-ionized water into the reactor, purge it with nitrogen for 45 minutes and at the same time heat the reactor to 60° C. Keep nitrogen purge for the entire polymerization process. After 45 minutes of nitrogen purge start charging 22 g of a 32.34% ammonium persulfate solution and 22.82 g of a 29.15% sodium metabisulfite solution (the redox initiators) simultaneously into the reactor through a syringe pump over 130 minutes. The monomer solution is charged 10 minutes after the onset of initiators charge and is added over 80 minutes. Allow the reaction to rise to between 65° C. and 70° C. and stay in that temperature range for one additional hour after finishing the addition of the redox initiators. Stop heating and let the reaction cool to room temperature before discharging the product.

Example 16

Preparation of poly(styrene-co-maleic anhydride)

Preparation of the copolymer of styrene and maleic anhydride is as follows: 48.37 g of maleic anhydride is dissolved in 293.46 g toluene in a 32 oz. container. Heat the toluene slightly (temperature <35° C.) with stirring to dissolve maleic anhydride. 51.58 g of styrene is then added into the maleic anhydride solution and mixed well to form the monomer solution. 579.18 g of toluene is charged into the reactor and purged with nitrogen while heating up to 85° C. Keep the nitrogen purge (or blanket) throughout the entire polymerization process. After purging nitrogen for 45 minutes at 85° C., Add 2.4 g of Luperox LP into the reactor and immediately start the addition of monomer solution over 90 minutes. Keep the reaction temperature at 85° C. for the initial 60 minutes after the onset of monomer addition. Then add 0.6 g of Luperox LP and raise the reaction temperature to 90° C. and keep at 90° C. until all monomer solution is charged. The reaction temperature is then raised to, and keep at 95° C. for one additional hour. Stop heating and let the reaction cool to below 40° C. before discharging. The product is filtered, washed twice with toluene and dried under vacuum. This polymer is dissolved in a caustic solution before use.

Example 17

3-Aminopropyltriethoxysilane modified poly(styrene-co-maleic anhydride)

The Poly(styrene-co-maleic anhydride) copolymer prepared above is modified with 3-Aminopropyltriethoxysilane as described below. 7 g of dry poly(styrene-co-maleic anhydride) is dispersed in 38 g toluene and the dispersion is heated at 50° C. for 20 minutes. Add 0.76 g of 3-aminopropyltriethoxysilane into the poly(styrene-co-maleic anhydride)-toluene slurry. Raise the temperature to and keep at 90° C. for 1 hour. Cool the reaction to below 40° C. and discharge the product. Dissolve the polymer product in a caustic solution before use.

Example 18

3-Aminopropyltriethoxysilane modified poly(styrene-co-maleic anhydride-co-acrylic acid)

The poly(styrene-co-maleic anhydride-co-acrylic acid) prepared in Example 1 is also modified with 3-aminopropyltriethoxysilane with the same procedure as described in (6) above Example 19

Preparation of poly(styrene-co-acrylic acid)

Prepare monomer solution by adding 509.09 g toluene, 34.77 g styrene, and 56.14 g acrylic acid into reactor. Sparge the monomer solution with nitrogen for at least 45 minutes while heating up to 75° C. Keep nitrogen purge throughout the entire polymerization process. After 45 minutes nitrogen purge add 6.79 g Luperox LP and keep the reaction at 75° C. for four hours. Then raise the temperature to 90° C. and keep at 90° C. for one hour. Stop heating and let the reaction cool to below 40° C. before discharging the product. Filter the product, wash twice with toluene, and dry under vacuum.

Example 20

Preparation of poly(acrylamide-co-2-acrylamido-2-methyl-1-propanesulfonic acid) and its hydroxamation Product Poly(acrylamide-co-2-acrylamido-2-methyl-1-propanesulfonic acid) is prepared in a similar way as poly(acrylamide-co-vinylphosphonic acid) described above in Example 13a except that vinylphosphonic acid is replaced with 2-acrylamido-2-methyl-1-propanesulfonic acid. Hydroxamated poly(acrylamide-co-2-acrylamido-2-methyl-1-propanesulfonic acid) is also conducted by the same process as described above. The structure of the resulting copolymer, as determined by NMR spectroscopy, contains hydroxamate, carboxylate, amide, and sulfonic group.

Recovery of Mineral Values and Precious Metals from Ores

In all of the examples the following notations are used: "percent or %" denotes "weight % or wt. %". And "g/t" denotes "gram per ton". "min." denotes "minutes". Rec. stands for recovery of value mineral in concentrate. S rec. represents the total recovery of all the sulfide minerals.

Examples 21-30

Recovery of Mineral Values from Cu—Mo Ore Body

An ore body containing Cu (0.72%) and Mo (0.0042%) is beneficiated by froth flotation. In each test, 1000 g of ore sample is ground for 8.5 min. in a mild steel rod mill containing a 7 kg rod charge and approximately 660 ml of water resulting in ground ore slurry with a particle size distribution of approximately 68% passing 150 microns. The froth phase modifiers are made in 2% caustic solution and added to the grinding mill at a dose of 150 g per ton of ore. The modifier enhancing agent is sodium hydroxide (although those skilled in the art will appreciate that other ion modifier enhancing agents such as KOH, $NH_4OH$, LiOH, tetramethyl ammonium hydroxide, tetraethylammonium hydroxide, and mixtures thereof can be appropriately substituted without undue experimentation) and it is added to the mill. In the comparative tests, lime is added to the mill to achieve a target pH of approximately 10 in the flotation stage. The slurry after grinding is then transferred to a 2.5 L Denver flotation cell and water is added to adjust the solids density to 33%. The slurry is agitated at 1300 rpm in the cell. The collector is added at 35 g per ton of ore in the grinding stage and 15 g per ton of ore to the flotation pulp in the second stage of flotation. The collector added is a blend of dicresyl dithiophosphate and diisobutyl monothiophosphate (a ratio of 70:30). The frother used is a (15:85) mixture of glycols and methyl isobutyl carbinol added at 40 g per ton of ore in the flotation stage. Flotation is conducted for approximately 10 minutes. The results are presented in Table 1.

TABLE 1

| Example number* | Froth Phase Modifier | Froth Phase Modifier, g/t | Lime Dose, g/t | Modifier enhancing agent, g/t | Cu Recovery, % | Conc Grade, % Cu |
|---|---|---|---|---|---|---|
| 1C | None | 0 | 1100 | 0 | 93.2 | 3.0 |
| 2C | Poly I | 150 | 1000 | 0 | 90.3 | 2.8 |
| 3C | Poly A | 150 | 0 | 0 | 92.1 | 9.7 |
| 4C | Poly H | 150 | 0 | 0 | 92.1 | 6.4 |
| 21 | Poly B | 150 | 0 | 500 | 95.3 | 8.8 |
| 22 | Poly D | 150 | 0 | 500 | 95.9 | 7.9 |
| 23 | Poly G | 150 | 0 | 500 | 95.9 | 9.2 |
| 24 | Poly J | 150 | 0 | 500 | 96.1 | 9.7 |
| 25 | Poly F | 150 | 0 | 500 | 95.8 | 9.4 |
| 26 | Poly L | 150 | 0 | 500 | 96.3 | 8.6 |
| 27 | Poly M | 150 | 0 | 500 | 94.7 | 8.1 |
| 28 | Poly N | 150 | 0 | 500 | 95.7 | 8.5 |
| 29 | Poly H | 150 | 0 | 500 | 95.7 | 8.9 |
| 30 | Poly I | 150 | 0 | 500 | 95.2 | 9.1 |

*C: Comparative
Poly A is Poly(styrene-co-maleic anhydride)
Poly B is Poly(styrene-co-maleic anhydride-co-acrylic acid)
Poly D is Poly(butyl vinyl ether-co-maleic anhydride)
Poly G is Poly(maleic anhydride-co-allyl sulfonic Acid)
Poly I is Poly(styrenesulfonic acid) (commercial sample obtained from Polysciences, Inc.)
Poly J is Poly(styrenesulfonic acid-co-maleic anhydride) (commercial sample obtained from Polysciences, Inc.)
Poly F is Poly(acrylamide-co-acrylic acid)
Poly L is Poly(vinylphosphonic-co-2-acrylamido-2-methyl-1-propanesulfonic acid)
Poly M is Poly(2-acrylamido-2-methyl-1-propanesulfonic acid-co-hydroxamic acid)
Poly H is Poly(vinylphosphonic acid) (commercial sample obtained from Polysciences, Inc.)
Poly N is Poly(vinylphosphonic acid-co-hydroxamic acid)

Example 31

Recovery of Mineral Values from Cu—Mo Ore Body

The general procedure of Examples 21-30 is used for the same ore except that the particle size distribution is approximately 64% passing 150 microns. Lime is used as the pH regulator in the two comparative tests and it is added to the grinding mill. The modifier enhancing agent is sodium hydroxide and it is added to the grinding mill. The results are presented in Table 2.

TABLE 2

| Example number* | Froth Phase Modifier | Froth Phase Modifier, g/t | Lime g/t | Modifier enhancing agent, g/t | Cu Recovery, % | Conc Grade, % Cu |
|---|---|---|---|---|---|---|
| 5C | None | 0 | 750 | 0 | 79.4 | 9.8 |
| 6C | Poly A | 150 | 750 | 0 | 81.1 | 8.3 |
| 31 | Poly A | 150 | 0 | 600 | 89.8 | 8.3 |

*C: Comparative
Poly A is Poly(styrene-co-maleic anhydride)

Examples 32-35

Recovery of Mineral Values from Cu—Mo Ore Body

The general procedure of Examples 21-30 is used for the same ore except that the particle size distribution is approximately 64% passing 150 microns. Lime is used as the pH regulator in one test and it is added to the grinding mill. Modifier enhancing agent is used in the other tests, as noted in Table 3, and it is added to the grinding mill. The results are presented in Table 3.

TABLE 3

| Example number* | Froth Phase Modifier | Froth Phase Modifier, g/t | Lime g/t | Modifier enhancing agent, g/t | Cu Recovery, % | Conc Grade, % Cu |
|---|---|---|---|---|---|---|
| 7C | None | 0 | 1000 | 0 | 76.5 | 18.0 |
| 32 | Poly B | 50 | | 200 | 82.7 | 16.6 |
| 33 | Poly E | 50 | | 200 | 82.4 | 17.4 |
| 34 | Poly B | 150 | | 600 | 91.6 | 14.1 |
| 35 | Poly E | 150 | | 600 | 90.5 | 13.7 |

*C: Comparative
Poly B is Poly(styrene-co-maleic anhydride-co-acrylic acid)
Poly E is Poly(vinyl acetate-co-maleic anhydride)

Examples 36-39

Recovery of Mineral Values from Cu—Mo Ore Body

Another ore body containing Cu (0.43%) and Mo (0.031%) is beneficiated by froth flotation by using the same procedure as stipulated in Examples 21-30 except that the grinding time is 8.3 min. The results are presented in Table 4.

TABLE 4

| Example Number* | Froth Phase Modifier | Froth Phase Modifier dose (g/t) | Lime, g/t | Modifier enhancing agent, g/t | Cu Recovery (%) | Mo Recovery % |
|---|---|---|---|---|---|---|
| 8C | None | 0 | 1000 | 0 | 85.0 | 71.2 |
| 36 | Poly B | 50 | 0 | 200 | 93.4 | 90.5 |
| 37 | Poly E | 50 | 0 | 200 | 91.2 | 80.3 |
| 38 | Poly B | 150 | 0 | 600 | 91.5 | 87.5 |
| 39 | Poly E | 150 | 0 | 600 | 92.5 | 94.8 |

*C denotes comparative test
Poly B is Poly(styrene-co-maleic anhydride-co-acrylic acid)
Poly E is Poly(vinyl acetate-co-maleic anhydride)

Examples 40-46

Recovery of Mineral Values from a Cu—Mo Ore Body

An ore body containing Cu (0.23%) and Mo (0.08%) is beneficiated by froth flotation. In each test, 1000 g of ore sample is ground for 12 min. in a mild steel rod mill containing a 10 kg rod charge and approximately 500 ml of water resulting in ground ore slurry with particle size distribution of approximately 60% passing 75 microns. In the comparative tests, lime is added to the grinding mill at approximately 100 g per ton of ore. The froth phase modifier is made in 2% caustic solution and added to the mill in the grinding stage. The modifier enhancing agent is sodium hydroxide, which is added at 375 g/t to the mill. The slurry is then transferred to a 2.5 L flotation cell and water is added to adjust the solids density to 34%. The slurry is agitated in the cell at a speed of 1200 rpm. In the comparative test, collector "Coll A", which is sodium isobutyl xanthate, is used as the collector at 25 g per ton of ore in the grinding stage, 5 g per ton of ore in the first conditioning stage and 5 g per ton of ore in the second flotation stage, the total dosage is thus 35 g per ton of ore. In examples of the present invention, the collector used is "Coll B", which contains 15% n-butoxycarbonyl n-butyl thionocarbamate, 12.5% allyl amyl xanthate ester, 12.5 wt. % aromatic hydrocarbon oil, and 60% isopropyl ethyl thionocarbamate, which is added at 15 g per ton of ore in the mill, and 5 g per ton of ore in the conditioning stage and 5 g per ton of ore in the second flotation stage, the total collector dosage is thus 20 g per ton of ore. In all tests, the frother used is Dowfroth 250, available from the Dow Chemical Company, USA, which is added at a dose of 20 g per ton of ore in the first conditioning stage and 5 g per ton of ore in the second conditioning stage. Each conditioning stage lasts 2 min. Sodium hydrosulfide is added in all tests at 18 g per ton of ore in the grinding stage, 5 g per ton of ore to ground pulp in the flotation cell in the first conditioning stage and 5 g per ton of ore in the second conditioning stage. The target pH in the flotation stage is approximately 9. Flotation is then conducted for 8 min. Results are presented in Table 5.

TABLE 5

| Example Number* | Froth Phase Modifier | Froth Phase Modifier, g/t | Lime, g/t | Modifier enhancing agent, g/t | Collector | Cu Recovery, % | Mo Recovery, % |
|---|---|---|---|---|---|---|---|
| 9C | None | 0 | 100 | 0 | Coll A | 84.4 | 90.2 |
| 10C | None | 0 | 100 | 0 | Coll B | 85.1 | 89.9 |
| 40 | Poly F | 150 | 100 | 375 | Coll B | 92.4 | 92.4 |
| 41 | Poly V | 150 | 100 | 375 | Coll B | 91.2 | 94.9 |
| 42 | Poly U | 150 | 100 | 375 | Coll B | 95.2 | 87.7 |
| 43 | Poly E | 150 | 100 | 375 | Coll B | 94.5 | 94.2 |
| 44 | Poly T | 150 | 100 | 375 | Coll B | 92.8 | 96.0 |
| 45 | Poly D | 150 | 100 | 375 | Coll B | 91.5 | 94.8 |
| 46 | Poly B | 150 | 100 | 375 | Coll B | 94.1 | 94.6 |

*C: Comparative Test
Poly G is Poly(maleic anhydride-co-allyl sulfonic Acid)
Poly B is Poly(styrene-co-maleic anhydride-co-acrylic acid)
Poly E is Poly(vinyl acetate-co-maleic anhydride)
Poly T is Poly(N-vinylpyrrolidone-co-maleic anhydride)
Poly D is Poly(butyl vinyl ether-co-maleic anhydride)
Poly U is Silane- and tert-octylamine modified Poly(N-vinylpyrrolidone-co-maleic anhydride)
Poly V Silane- and tert-octylamine modified Poly(N-vinylpyrrolidone-co-maleic anhydride)

Examples 47-48

Recovery of Mineral and Metal Values from a Precious Metal Containing Ore Body The general procedure of Examples 40-46 is used for the same ore. Lime is used as the pH regulator in the comparative test and it is added to the grinding mill. Modifier enhancing agent is sodium hydroxide and it is used as noted in Table 6, and it is added to the grinding mill along with the froth phase modifier. The results are presented in Table 6.

TABLE 6

| Example Number* | Froth Phase Modifier | Lime, g/t | Modifier enhancing agent, g/t | Cu Recovery, % | Conc Grade, % Cu |
|---|---|---|---|---|---|
| 11C | None | 100 | 0 | 75.6 | 3.3 |
| 12C | None | 0 | 100 | 75.7 | 3.7 |
| 13C | Poly A | 100 | 0 | 67.2 | 3.8 |
| 47 | Poly A | 0 | 100 | 79.4 | 3.6 |
| 14C | Poly B | 100 | 0 | 37.3 | 1.2 |
| 48 | Poly B | 0 | 100 | 78.4 | 3.8 |

*C: Comparative Test
Poly A is Poly(styrene-co-maleic anhydride)
Poly B is Poly(styrene-co-maleic anhydride-co-acrylic acid)

Examples 49-50

Recovery of Mineral and Metal Values from a Cu—Au Ore Body

An ore body containing Cu (0.27%), Au (0.9 g per ton of ore) and Ag (30 g per ton of ore) is beneficiated by froth flotation. In each test, 1000 g of ore sample is ground for 15 min. in a mild steel rod mill containing a 10 kg rod charge and approximately 667 ml of water resulting in ground ore slurry with a particle size distribution of approximately 80% passing 100 microns. The slurry is then transferred to a 2.5 L flotation cell and water is added to adjust the solids density to 34%. The slurry is agitated at 1200 rpm. The froth phase modifier is made in 2% caustic solution and is added to the mill in the grinding stage. The modifier enhancing agent is sodium hydroxide which is added to the mill. The collector used is a formulation of 14.4% n-butoxycarbonyl n-butyl thionocarbamate, 33.6% dicresyl dithiophosphate/diisobutyl monothiophosphate (70:30 ratio), 14.4% diisobutyl dithiophosphinate, and 33.6% sodium mercaptobenzothiazole, which is added at 9 g per ton of ore to the mill, and 9 g per ton ore to the flotation cell in the second conditioning stage. The frother is AEROFROTH AF76A (Cytec Industries Inc., West Paterson, N.J.), added at 5 g per ton of ore to the ground pulp in the flotation cell in the first conditioning stage and 5 g per ton of ore in the second conditioning stage. Flotation is then conducted for 12 min. The results are presented in Table 7.

TABLE 7

| Example Number* | Froth phase modifier | Froth phase modifier, g/t | Lime g/t | Modifier enhancing agent, g/t | Cu Recovery, % | Conc Grade, % Cu | Au Recovery, % |
|---|---|---|---|---|---|---|---|
| 15C | None | 0 | 2700 | 0 | 79.7 | 1.8 | 91.8 |
| 16C | Poly A | 150 | 2800 | 0 | 77.3 | 2.4 | 91.7 |
| 49 | Poly A | 150 | 0 | 2500 | 81.5 | 1.4 | 93.2 |
| 17C | Poly K | 150 | 2700 | 0 | 78.3 | 1.9 | 93.4 |
| 50 | Poly K | 150 | 0 | 2500 | 85.3 | 1.8 | 93.2 |

*C: Comparative
Poly A is Poly(styrene-co-maleic anhydride)
Poly K is Poly(styrene-co-maleic anhydride-co-2-acrylamido-2-methyl-1-propanesulfonic acid)

Examples 51-52

Recovery of Mineral and Metal Values from a Cu—Au Ore Body

An ore body containing Cu (0.27%), Au (0.9 g per ton of ore) and Ag (30 g per ton of ore) is beneficiated by froth flotation. In each test, approximately 1 kg of ore sample is ground for 15 min. in a mild steel rod mill containing a 10 kg rod charge and approximately 667 ml of water resulting in slurry with a particle size distribution of approximately 80% passing 100 microns. The slurry is then transferred to a 2.5 L flotation cell and the agitator speed is set to 1200 rpm, thus agitating the slurry. The froth phase modifier is added to the mill in the grinding stage. The collector is added at 10 g per ton of ore in the mill, and 25 g per ton of ore in the conditioning stage. The total collector dosage is 18 g per ton of ore. The frother added is AF76A (obtained from Cytec Industries Inc., West Patterson, N.J.) and its dosage is 5 g per ton of ore in the conditioning stage and 5 g per ton of ore in the second conditioning stage. A 25% solution of sulfuric acid is added to the flotation cell containing ground ore slurry, in an amount effective to lower the pH reading by 2 units below its starting value. Each conditioning stage lasts 2 min. Flotation is then conducted for 12 min. Results are presented in Table 8.

TABLE 8

| Example Number* | Collector type | Froth phase modifier | Froth phase modifier g/t | Cu Recovery % | Au Recovery % | Ag Recovery % |
|---|---|---|---|---|---|---|
| 18C | Coll A | None | 0 | 80.8 | 86.7 | 72.8 |
| 51 | Coll A | Poly G | 150 | 86.4 | 90.6 | 82.4 |
| 19C | Coll B | None | 0 | 82.6 | 84.2 | 74.0 |
| 52 | Coll B | Poly G | 150 | 89.0 | 92.7 | 85.4 |

*C: Comparative
Poly G is Poly(maleic anhydride-co-allyl sulfonic acid)
Coll A contains 80% diisobutyl dithiophosphate and 20% diisobutyl monothiophosphate
Coll B is n-butoxycarbonyl n-butyl thionocarbamate

Examples 53-58

Recovery of Mineral and Metal Values from a Cu Ore Body

An ore body containing Cu (0.75%) is beneficiated by froth flotation. In each test, 1 kg of ore sample is ground for 6 min. in a mild steel rod mill containing a 7 kg rod charge and approximately 1000 ml of water resulting in slurry having a particle size distribution of approximately 70% passing 150 microns. The froth phase modifiers are made in 2% caustic solution and added at 150 g per ton of ore to the mill in the grinding stage. For the comparative test, lime is added to the mill to achieve a target pH of 10 in the flotation stage. The modifier enhancing agent is sodium hydroxide and it is added to the mill. The ground slurry is transferred to a 2.5 L Denver flotation cell and water is added to obtain slurry with solids density of 33%. The slurry is agitated at 1200 rpm. The collector is added at 10 g per ton of ore in the grinding stage and 25 g per ton of ore to the ground pulp in the flotation cell. The collector contains 40% n-butoxycarbonyl n-butyl thionocarbamate, 20% isopropyl ethyl thionocarbamate, and 40% n-butoxycarbonyl n-butyl dithiocarbamate. The frother used is X-583 from Cytec Industries Inc., West Paterson, N.J. and added at 20 g per ton of ore to the pulp in the flotation cell. Flotation is conducted for approximately 10 min. The results are presented in Table 9.

TABLE 9

| Example Number* | Froth phase modifier | Froth phase modifier, g/t | Lime g/t | Modifier enhancing agent, g/t | Cu Recovery, % | Conc Grade, % Cu |
|---|---|---|---|---|---|---|
| 20C | None | 0 | 1000 | 0 | 73.2 | 4.0 |
| 21C | Poly G | 160 | 650 | 0 | 68.1 | 3.4 |
| 53 | Poly G | 160 | 0 | 600 | 81.4 | 3.2 |
| 54 | Poly A | 200 | 0 | 600 | 74.6 | 5.6 |
| 55 | Poly B | 200 | 0 | 600 | 76.4 | 4.3 |
| 56 | Poly K | 200 | 0 | 600 | 79.9 | 3.8 |
| 57 | Poly R | 200 | 0 | 600 | 78.0 | 4.3 |
| 58 | Poly S | 200 | 0 | 600 | 78.6 | 3.0 |

*C: Comparative
Poly G is Poly(maleic anhydride-co-allyl sulfonic Acid)
Poly A is Poly(styrene-co-maleic anhydride)
Poly B is Poly(styrene-co-maleic anhydride-co-acrylic Acid)
Poly K is Poly(styrene-co-maleic anhydride-co-2-acrylamido-2-methyl-1-propanesulfonic acid)
Poly R is Poly(styrene-co-maleic anhydride-co-styrenesulfonic Acid)
Poly S is Poly(vinyl acetate-co-maleic anhydride-co-2-acrylamido-2-methyl-1-propane-sulfonic acid)

Examples 59-62

Recovery of Mineral and Metal Values from a Precious Metal Containing Ore Body An ore body containing platinum group precious metals (approximately 2 g/t of Pt and 2 g/t of Pd; also containing value minerals of Cu and Ni) is beneficiated by froth flotation in a single stage of grinding and flotation with the objective of maximizing the recovery of Pt and Pd in this stage. Additionally, it is desirable to recover almost all of the sulfide minerals including those of Cu and Ni. In each test, approximately 1 kg of ore sample is ground for 29.5 min. in a mild steel rod mill containing a 10 kg rod charge and approximately 670 ml of water resulting in slurry having a particle size distribution of approximately 50% passing 75 microns. The froth phase modifiers are added at 150 g per ton of ore to the mill, along with 50 g/t of guar gum depressant. The modifier enhancing agent is sodium hydroxide, and is added into the mill at 60 g per ton of ore. The ground slurry is transferred to the 2.5 L Denver flotation cell and water is added to obtain slurry solids density of 33%. The slurry is agitated at 1300 rpm. In the comparative tests the collector is "Coll A" which contains 50% sodium isobutyl xanthate and 50% sodium ethyl dithiophosphate. The dosage of Coll A is 30 g per ton of ore, added to the ground pulp in the flotation cell. In examples of the present invention the collector is "Coll B" which contains 25% sodium isobutyl xanthate, 25% sodium ethyl dithiophosphate, 12.5% n-butoxycarbonyl n-butyl dithiocarbamate, 12.5% n-butoxycarbonyl n-butyl thionocarbamate, 12.5% allyl amyl xanthate ester, and 12.5% allyl isobutyl thionocarbamate. Coll B is added at 30 g/t to the ground pulp in the flotation cell. In all tests, the frother is MIBC at 30 g per ton of ore added to the ground pulp in the flotation cell. The pulp is conditioned for 2 min. Flotation is then conducted for approximately 20 min. The results are presented in Table 10.

TABLE 10

| Example Number* | Froth Phase Modifier | Froth Phase Modifier, g/t | Modifier enhancing agent | Collector | Pt Recovery, % | Pd Recovery, % |
|---|---|---|---|---|---|---|
| 22C | None | None | 0 | Coll A | 25.8 | 13.9 |
| 23C | None | None | 0 | Coll B | 50.4 | 21.8 |
| 59 | Poly D | 150 | 60 | Coll B | 51.3 | 22.7 |
| 60 | Poly L | 150 | 60 | Coll B | 52.5 | 31.4 |
| 61 | Poly C | 150 | 60 | Coll B | 54.3 | 47.1 |
| 62 | Poly I | 150 | 60 | Coll B | 55.2 | 33.9 |

*C: Comparative
Poly D is Poly(butyl vinyl ether-co-maleic anhydride)
Poly L is Poly(vinylphosphonic-co-2-acrylamido-2-methyl-1-propanesulfonic acid)
Poly C is Poly(styrene-co-acrylic acid)
Poly I is Poly(styrenesulfonic acid) (commercial sample obtained from Polysciences, Inc.)

Example 63

Recovery of Mineral and Metal Values from a Precious Metal Containing Ore Body

The general procedure of Examples 59-62 is used for the same ore. Lime is used as the pH regulator in one test and it is added to the grinding mill. Modifier enhancing agent is used in another test, as noted in Table 11, and it is added to the grinding mill along with the froth phase modifier. The results are presented in Table 11.

TABLE 11

| Example Number* | Froth Phase Modifier | Froth Phase Modifier, g/t | Collector | Lime, g/t | Modifier enhancing agent, g/t | Pt Recovery, % | Pd Recovery, % |
|---|---|---|---|---|---|---|---|
| 24C | Poly F | 150 | Coll B | 200 | 0 | 60.2 | 63.3 |
| 63 | Poly F | 150 | Coll B |  | 250 | 64.5 | 67.8 |

*C: Comparative
Poly F is Poly(acrylamide-co-acrylic acid)

Example 64-65

Recovery of Mineral Values from Ni Ore Body

An ore body containing Ni (0.6%) and S (3.7%, representing all of the sulfide minerals) is beneficiated by froth flotation with the principal objective of maximizing the recovery of Ni. Additionally, it is desirable to recover almost all of the sulfide minerals including those of Ni—that is maximizing S recovery. In each test, approximately 500 g of ore sample is ground for 10.5 min. in a mild steel rod mill containing a 7 kg rod charge and approximately 333 ml of water resulting in ground ore slurry with a particle size distribution of approximately 50% passing 75 microns. The froth phase modifiers are added to the grind. The slurry is then transferred to a flotation cell and agitated at a speed of approximately 1300 rpm at either 20% or 40% solids. Collector, at approximately 40 g per ton of ore, and MIBC frother, at approximately 40 g per ton of ore, are then added and the pulp is conditioned for 2 min. The process is run in acidic conditions, i.e. sulfuric acid is added at approximately 10 kg per ton of ore in the conditioning stage and collector and frother are added during acid addition. Flotation is then conducted for approximately 12 min. Results are presented in Table 12.

TABLE 12

| Example Number* | Collector Type | Collector Dose, g/t | % Solids in Flotation | From Phase Modifier | From Phase Modifier Dose, g/t | Ni Recovery (%) | S Recovery (%) |
|---|---|---|---|---|---|---|---|
| 25C | Coll A + PAX | 20 + 40 | 20 | None | 0 | 71.3 | 30.6 |
| 64 | Coll A + PAX | 20 + 20 | 20 | Poly G | 150 | 72.1 | 87.8 |
| 65 | Coll A + PAX | 20 + 20 | 42 | Poly G | 600 | 76.5 | 93.0 |

*C denotes comparative test
Poly G is Poly(maleic anhydride-co-allyl sulfonic acid)
Coll A contains sodium mercaptobenzothiazole, sodium dialkyl dithiocarbamate and sodium dialkyl dithiophosphate in a 1:1:1 ratio.
PAX is potassium amyl xanthate.

Various patent and/or scientific literature references have been referred to throughout this application. The disclosures of these publications in their entireties are hereby incorporated by reference as if written herein. In view of the above description and the examples, one of ordinary skill in the art will be able to practice the disclosure as claimed without undue experimentation.

While the invention has been described with reference to various exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method of enhancing recovery of a value sulfide mineral and/or a precious metal-bearing mineral from an ore containing said value sulfide mineral and/or precious metal-bearing mineral, and one or more of a Mg-silicate, a slime forming mineral, and/or a clay, said method comprising:
   adding to one or more stage of a froth flotation process performed under acidic conditions a froth phase modifier comprising a polymer selected from the group consisting of poly(styrene-co-maleic anhydride-co-2-acrylamido-2-methyl-1-propanesulfonic acid),
poly(allyl sulfonate-co-maleic anhydride),
hydroxamated poly(acrylamide-co-vinylphosphonic acid),
poly(acrylic acid-co-vinylphosphonic acid),
poly(2-acrylamido-2-methyl-1-propanesulfonic acid-co-vinylphosphonic acid),
silane- and tert-octylamine modified poly(N-vinylpyrrolidone-co-maleic anhydride),
3-aminopropyltriethoxysilane modified poly(styrene-co-maleic anhydride),
3-aminopropyltriethoxysilane modified poly(styrene-co-maleic anhydride-co-acrylic acid),
hydroxamated poly(acrylamide-co-2-acrylamido-2-methyl-1-propanesulfonic acid), and mixtures thereof,
thereby enhancing recovery of said value sulfide mineral and/or precious metal-bearing mineral from said ore.

2. A method according to claim 1, wherein said froth phase modifier is added in an amount from 10 g per ton to 5000 g per ton of ore.

3. A method according to claim 2, wherein the froth phase modifier is added in an amount from 25 g per ton to 2500 g per ton of ore.

4. A method according to claim 3, wherein the froth phase modifier is added in an amount from 50 g per ton to 1500 g per ton of ore.

5. A method according to claim 4, wherein the froth phase modifier is added in an amount from 100 g per ton to 1000 g per ton of ore.

6. A method according to claim 1, further comprising adding a collector to one or more stages of the froth flotation process.

7. A method according to claim 6, wherein said collector is selected from the group consisting of alkoxycarbonyl alkyl dithiocarbamate, mercaptobenzothiazole, dialkyl dithiocarbamate, diaryl or dialkyl dithiophosphate, dialkyl dithiophosphinate, alkoxycarbonyl alkyl thionocarbamate, allyl alkyl thionocarbamate, allyl alkyl xanthate ester, dialkyl thionocarbamate, and mixtures thereof.

8. A method according to claim 6, wherein said collector is a formulation comprising alkoxycarbonyl alkyl dithiocarbamate, dialkyl dithiophosphate, and alkoxycarbonyl alkyl thionocarbamate.

9. A method according to claim 6, wherein said collector is a formulation comprising mercaptobenzothiazole, sodium dialkyl dithiocarbamate, and sodium dialkyl dithiophosphate.

10. A method according to claim 6, wherein said collector is a formulation comprising alkoxycarbonyl alkyl thionocarbamate, allyl alkyl xanthate ester, dialkyl thionocarbamate, and aromatic hydrocarbon oil.

11. A method according to any one of claims 6 to 10, wherein said collector is added in an amount from 5 g per ton to 500 g per ton of ore.

12. A method according to claim 11, wherein the collector is added in an amount from 10 g per ton to 200 g per ton of ore.

13. A method according to claim 12, wherein the collector is added in an amount from 20 g per ton to 100 g per ton of ore.

14. A method according to claim 1, wherein said ore containing Mg-silicate, slime forming mineral, and/or clay is a Ni ore and/or a platinum group metal ore.

* * * * *